US008779919B1

(12) United States Patent
Darling et al.

(10) Patent No.: US 8,779,919 B1
(45) Date of Patent: Jul. 15, 2014

(54) EVENT COMMUNICATION APPARATUS AND METHOD

(71) Applicant: Instant Care, Inc., Vista, CA (US)

(72) Inventors: Richard Darling, Poway, CA (US);
George Seelman, Temecula, CA (US);
Fong Chang, Diamond Bar, CA (US);
David Martinez, Simpsonville, SC (US)

(73) Assignee: Instant Care, Inc., Vista, CA (US)

( * ) Notice: Subject to any disclaimer, the term of this patent is extended or adjusted under 35 U.S.C. 154(b) by 0 days.

(21) Appl. No.: 14/070,566

(22) Filed: Nov. 3, 2013

(51) Int. Cl.
*G08B 1/08* (2006.01)
*H04L 29/08* (2006.01)
*H04L 29/06* (2006.01)
*G08B 25/00* (2006.01)

(52) U.S. Cl.
CPC .............. *H04L 67/327* (2013.01); *H04L 69/18* (2013.01); *G08B 25/004* (2013.01)
USPC ..................................... 340/539.16; 709/207

(58) Field of Classification Search
CPC ... H04L 63/0263; H04L 67/32; H04L 67/327; H04L 69/14; H04L 69/18; G08B 25/001; G08B 25/004; G08B 25/007
USPC .............................. 340/539.16; 709/207, 217
See application file for complete search history.

(56) References Cited

U.S. PATENT DOCUMENTS

| | | | |
|---|---|---|---|
| 3,914,692 A | 10/1975 | Seaborn, Jr. | |
| 4,475,011 A * | 10/1984 | Brightman et al. | 379/253 |
| 5,305,370 A | 4/1994 | Kearns et al. | |
| 5,515,419 A | 5/1996 | Sheffer | |
| 6,058,307 A * | 5/2000 | Garner | 455/428 |
| 6,093,146 A | 7/2000 | Filangeri | |
| 6,243,580 B1 * | 6/2001 | Garner | 455/428 |
| 6,518,889 B2 | 2/2003 | Schlager et al. | |
| 6,907,375 B2 * | 6/2005 | Guggari et al. | 702/113 |
| 7,246,156 B2 * | 7/2007 | Ginter et al. | 709/217 |
| 7,315,736 B2 | 1/2008 | Jenkins | |
| 7,382,243 B1 | 6/2008 | Shepher | |
| 7,397,907 B2 | 7/2008 | Petite | |
| 7,702,739 B1 * | 4/2010 | Cheng et al. | 709/207 |
| 8,477,911 B2 | 7/2013 | Darling | |
| 2002/0177428 A1 * | 11/2002 | Menard et al. | 455/404 |
| 2004/0246128 A1 | 12/2004 | Menard | |
| 2006/0123053 A1 * | 6/2006 | Scannell, Jr. | 707/104.1 |
| 2007/0082651 A1 | 4/2007 | Loizeaux | |
| 2008/0085696 A1 | 4/2008 | Salahshour et al. | |
| 2008/0117029 A1 * | 5/2008 | Dohrmann et al. | 340/286.02 |
| 2010/0023598 A9 * | 1/2010 | Ginter et al. | 709/217 |

FOREIGN PATENT DOCUMENTS

EP 0208080 A1 1/1987

OTHER PUBLICATIONS

Beard eti al., A Discrete Fourier Transform Based Digital DTMF, Journal, Fall 1995, pp. 59-71, Dept. of Electrical & Computer Engineering, Mississippi State Univ., Mississippi State, US.

* cited by examiner

*Primary Examiner* — John A Tweel, Jr.
(74) *Attorney, Agent, or Firm* — Thibault Patent Group

(57) ABSTRACT

A method and apparatus is described for transmitting event codes from a base station to a remote location. In one embodiment, a method is described, executed by a processor within an event communication module, the method comprising receiving an encoded event code from a base station over an interface connection, selecting a first transmission method from two or more communication methods based on the received event code, encoding the event code based on the first communication method, and transmitting the encoded event code to remote location by a communication module configured to communicate using the first communication method.

20 Claims, 6 Drawing Sheets

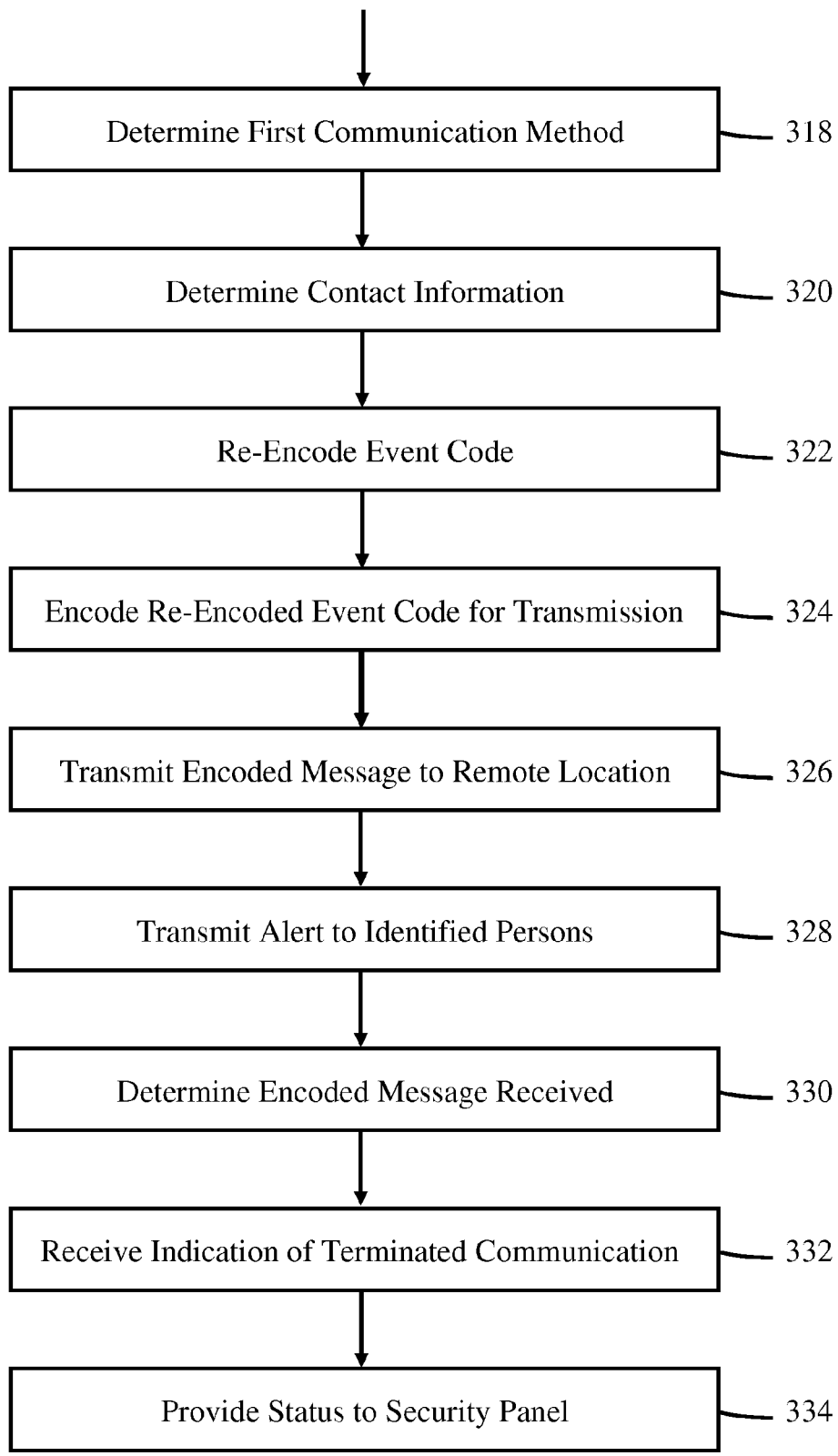
FIG. 3 Con't

EVENT COMMUNICATION APPARATUS AND METHOD

TECHNICAL FIELD

The present disclosure relates generally to alarm and event notification methods and systems, and more particularly to an apparatus and method to selectively transmit alarm signals to a remote monitoring center or third party intermediary.

BACKGROUND

In modern home-based security systems, sensors are typically installed throughout a home for detecting "emergency" events such as fire, smoke, break-in, excessive levels of carbon monoxide, etc. When such an event is detected, sensors send an alert message to a local security panel, where the event is evaluated to determine whether to notify authorities. If so, an alarm signal is sent to a remote monitoring center or third party. In the past, such alarm signals were transmitted primarily over telephone wires, aka the "plain old telephone system" or POTS. However, modern-day security systems are now capable of transmitting wirelessly, over circuit-switched cellular networks. However, signals transmitted on such wireless networks are not typically transmitted directly to remote monitoring centers, as today's remote monitoring centers generally lack the resources needed to receive the wireless signals and convert them into a format compatible with their legacy systems. Thus, cellular alarm signals sent from modern-day security panels are typically transmitted to intermediate, third-party enterprises, that convert the cellular signals into a format compatible with remote monitoring centers, and then send the converted signals to the remote monitoring centers via a dedicated communication channel or a public network, such as the Internet.

Some modern security panels are capable of transmitting on both the POTS network and cellular-switched networks. However, only one mode of transmission is typically enabled at any given time. Thus, every alarm signal sent by the security panel is transmitted the same way every time, no matter whether the event is of an urgent nature (such as detection of smoke or fire), or a non-urgent nature (such as a "battery low" condition of one of the system sensors). In the case of a life-threatening event, delays or outages of one particular communication network could mean that urgent help is delayed or never provided.

It would be desirable to consider whether an alarm signal is of an urgent nature or not and, if so, ensure that the proper authorities are notified in the most expedient and reliable method possible.

SUMMARY

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

In one embodiment, an event communication module is described, comprising a connection interface for receiving alarm event information from a security panel, the alarm event information comprising a connection interface for receiving alarm event information from a security panel, the alarm event information comprising an event code indicative of a condition occurring at a premises where the security panel is located, a memory for storing processor-executable instructions and criteria for determining a communication method used to transmit information, a processor for executing the processor-executable instructions that cause the alarm event communication module to decode the event code from the alarm event information, select a first transmission method from two or more transmission methods based on the event code and the criteria, and encode the event code into a format suitable for transmission in conformance with the first transmission method selected by the processor, and a first communication module, configured to transmit the encoded event code using the first transmission method.

In another embodiment, a method is described, executed by a processor within an alarm event communication module, for transmitting event codes from a security panel to a remote location, the method comprising receiving an encoded event code from a security panel over an interface connection, selecting a first transmission method from two or more communication methods based on the received event code, encoding the event code based on the first communication method, and transmitting the encoded event code to remote location by a communication module configured to communicate using the first communication method.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

Unless defined otherwise, all technical and scientific terms used herein have the same meaning as is commonly understood by one of ordinary skill in the art. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The concepts described herein relate to an event communication apparatus and method for use in conjunction with a home or business security system, or other system that determine a condition occurring at a premises and reports the condition to a remote location. For example, the concepts described herein could equally apply to a personal emergency response system, (PERS), otherwise known as a medical personal emergency response system (MPERS). Such systems monitor individuals for falls, medical problems, or other personal emergencies, generally comprising a wearable monitoring device and a base station that receives alerts from the monitoring devices. In response to an alert, the base station contacts a remote monitoring center, allowing an individual to speak with a dispatcher located at the remote monitoring center, and for the dispatcher to send emergency personnel to the premises if needed. The concepts described herein could also be applied to "hybrid" systems as well, such as a security system configured to not only report security-based events to a remote location, but to also send medical event information to a remote location in association with a medical monitoring device worn by an individual.

The alarm event communication module of the present invention allows for a plurality of ways to send alarm event information from a home or business security system, and/or other monitoring systems, to a remote location, such as a remote monitoring center or intermediary third party. In one embodiment, a transmission method is determined, at least in part, by an urgency or priority assigned to an event code generated by the security system.

Figure 1:
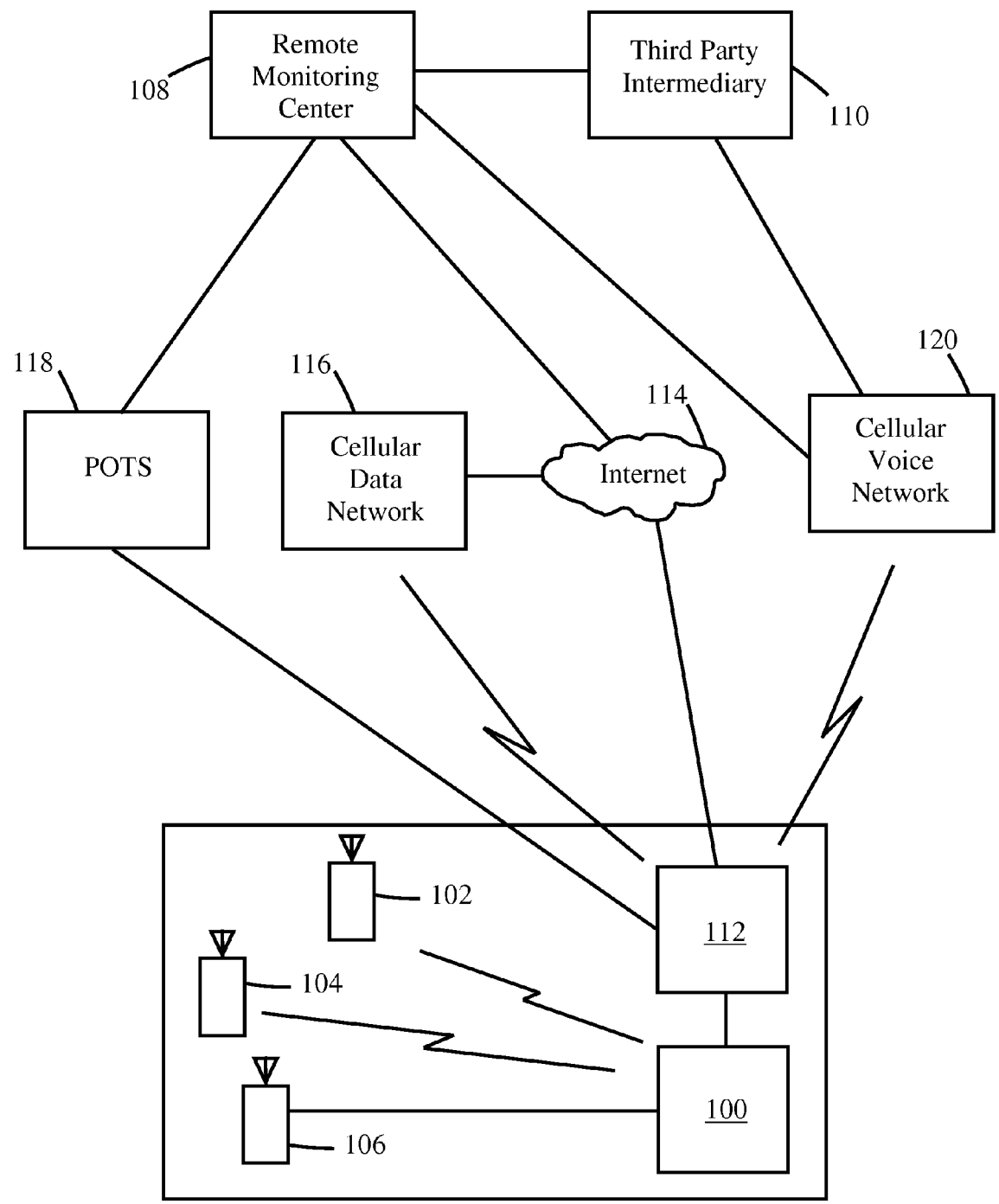
FIG. 1 illustrates one embodiment of a home or business security system, and related communication networks, in accordance with the teachings herein.

FIG. 1 illustrates one embodiment of a typical home or business security system in accordance with the teachings herein, shown as base station 100 and sensors 102, 104, and 106. For example, sensor 102 might comprise a smoke detector, sensor 104 a carbon monoxide detector, and sensor 106 a door/window contact sensor. Although FIG. 1, and the remainder of this disclosure, describes the inventive concepts herein in terms of a home security system, it should be understood that they can also be applied to other types of monitoring systems, such as a PERS or MPERS system described above.

The base station 100 and sensors are typically installed inside a home or business to detect and report one or more conditions of the premises or a monitored item, herein referred to as "alarm events", such as a detection of smoke, fire, carbon monoxide, break-ins, health emergencies, etc. Such events can be considered to be "urgent conditions", "urgent events" or "emergency events" because the nature of such events implies a high probability of an imminent loss of life or property. Such an urgent or emergency event may also be defined by whether a response from authorities is desired. Such authorities comprise police, fire, paramedic, ambulance, etc. Alarm events can also comprise "non-urgent" events, such a sensor battery becoming low, a loss of "supervisory" from a sensor, low water pressure, etc. In either case, when an alarm event is sensed by one or more of the sensors, a message is sent to the base station 100 indicative of the event. Each of the detectors is typically able to communicate with the base station 100 via wired and/or wireless means that are well-known in the art.

After receiving an alarm event from one or more of the sensors, base station 100 may send an alarm signal to a remote monitoring center 108 or third party intermediary 110 indicative of the event sensed by one or more of the sensors. Such alarm signals may be encoded using well-known alarm reporting protocols, such as Ademco contact ID, SIA, 4-2, Radionics, and Tunstall. In prior art systems, the base station 100 might be directly connected to the POTS network and call the remote monitoring center using a telephone number pre-programmed into the base station 100. In this example, the alarm signal typically comprises DTMF tones encoded with the afore-mentioned alarm reporting protocols.

In newer security systems, security panels may comprise wireless communication capabilities for communicating with the third party intermediary 110 via cellular or Wi-Fi techniques. For example, base station 100 may store a telephone number associated with the third party intermediary 110 and place a circuit-switched cellular call to the third party intermediary when an alarm event is detected. The third party intermediary 110 receives the call from the base station 100 and converts the call into a format in conformance with a communication protocol suitable for the remote monitoring center 108.

In the present system of FIG. 1, base station 100 no longer communicates directly with remote monitoring center 108 or the third party intermediary 110. Rather, alarm signals, widely referred to in the security industry as event codes, are provided from base station 100 to alarm event communication module (AECM) 112 for transmission to the remote monitoring center 108 or the third party intermediary 110. AECM 112 is typically a stand-alone device that is capable of transmission using two or more communication methods. In one embodiment, when AECM 112 receives an event code from the base station 100, it determines whether the event code represents an event of an urgent nature, and determines, based on a pre-assigned urgency or priority of the event code, how and where to transmit the event code. AECM 112, in addition, may comprise the necessary circuitry, software, and/or firmware to conduct a voice and/or data communication with remote monitoring center 108 or third party intermediary 110 via a wide area network, such as Internet 114, cellular data network 116, POTS network 118, and/or cellular voice network 120. AECM 112 may transmit information using a one or more of a variety of protocols, including instant messaging TCP/IP, CDMA, GSM, (i.e., SMS), SMTP, SIA, 4-2, Radionics, and Tunstall, DTMF tones, etc. For example, AECM 112 may receive an event code from the base station 100 pre-designated by AECM 112 as being of an urgent nature. The AECM 112 determines that the received event code is of an urgent nature and, as a result, selects a fastest and/or most reliable communication method of communication from two or more communication methods available to the AECM 112. Alternatively, if the AECM 112 determines that a received event code from the base station 100 is not of an urgent nature, the AECM 112 may select a method of communication based on the most cost-effective way to communicate. Selection of the communication method by the AECM 112 is described later herein.

When the remote monitoring center 108 receives the transmission from AECM 112, either directly or via third party intermediary 110, it is decoded in accordance with the particular alarm reporting protocol used by base station 100 to obtain the event code, and the event code is displayed in a language readable by a human observer at the remote monitoring center 108. In response, the human observer may take one or more actions, such as place a phone call, text, or other communication to a home or business owner, or to the place where the base station 100 is located, in order to determine if an actual emergency event is indeed occurring. The human observer may, in addition or alternatively, contact certain authorities to respond to the event code, such as a fire station if the event code is indicative of a fire or police if the event code is indicative of a break-in, or both. In another embodiment, a two-way voice communication may be opened with the human observer as well, allowing the human observer to speak with a person located at base station 100. This may be accomplished using a microphone/speaker combination via the base station 100, by a microphone/speaker combination via the AECM 112, or both.

Base station 100 comprises any device capable of monitoring a condition of an individual, premises, area, or other condition occurring at the premises where base station 100 is installed, and/or where one or more remote sensing devices is installed, and reporting such conditions to a remote location. In one embodiment, base station 100 comprises one of any number of security panels available on the market, such as the Honeywell Ademco L5100 Lynx Touch Wireless Alarm Control Panel sold by Honeywell International, Incorporated of Morristown, N.J. Such security panels are typically able to communicate with a variety of sensors, either by wired or wireless means. Such wireless communications typically comprise one or more common wireless protocols, such as the popular Zigbee and Z-Wave protocols, as well as other proprietary protocols used by companies such as Honeywell, 2Gig Technologies (now part of Linear LLC of Carlsbad, Calif.), General Electric Company (now part of United Technologies Company of Hartford, Conn.), etc. In another embodiment, base station 100 comprises a "communicator", part of a Lifeline medical alert system sold by Koninklijke Philips N.V of Amsterdam, Netherlands.

When an alarm event is reported by one of the sensors in communication with the base station 100, the base station 100 may generate a message for receipt by the remote monitoring center 108, referred to herein as "alarm event information". The alarm event information typically comprises an "event code" which is typically a numeric code that is pre-assigned to a particular event. For example, detection of fire by one of the sensors could be pre-assigned an event code of 110, while detection of a low battery condition of one of the sensors could be pre-assigned an event code of 384. Typically, each security panel manufacturer pre-assigns different event codes to different sensed conditions and stores the event codes, and a description of the event assigned to each event code, in memory for transmission to the remote monitoring center 108, or for local display to a user of the base station 100. For example, a list of event codes adopted by Ademco Alarm Systems (now part of Honeywell International, Incorporated) is shown in Appendix A. The alarm event information typically comprises other information as well, such as the date and time that the alarm event was sensed, customer identification or a subscriber ID, sensor ID that reported the alarm event, a "zone" that the alarm event occurred, etc. The alarm event information is provided to the AECM 112, typically through an RJ-11 jack.

The sensors may each comprise any number of sensors available in the marketplace, such as a Honeywell Universal Magnetic Contact p/n 7940, an APX-101PIR sensor manufactured by Aleph America Corporation of Reno, Nev., the 58083 wireless heat and smoke detector manufactured by Honeywell International, Inc., a Dbell1 wireless doorbell manufactured by 2Gig, an HD100 security camera manufactured by 2Gig, a 5802MN2 wireless panic button manufactured by Ademco, a 5853 glass breakage detector manufactured by Honeywell International, Incorporated, a 580000 carbon monoxide detector manufactured by Honeywell International, Incorporated. Although only 3 sensors are shown in FIG. 1, in practice, typically a large number of sensors, in various combinations, are installed to provide security and safety monitoring. For example, each door and window in a residence may be equipped with a magnetic sensor, several PIR detectors may be installed, a plurality of outdoor security cameras may be utilized, etc.

In one embodiment, the AECM 112 is programmable via one of the communication modules or a dedicated communication module such as a UART or USB interface, or via a user interface located on AECM 112. Information stored within AECM 112, such as contact information, urgency or priority information, event code information, communication method information, etc., may be modified or deleted, and/or new information added. For example, the AECM 112 may be programmed at any time to take advantage of changing communication costs, reliabilities, or speeds.

AECM 112 may communicate over a number of communication networks using one or more communication protocols. For example, AECM 112 may be configured to communicate over Internet 114, cellular data network 116, POTS network 118, and/or cellular voice network 120. The Internet 114 is a well-known, public network that routes data packets from source to destination using protocols such as TCP/IP, FTP, SMTP, etc. The POTS network 118 (plain old phone system) is the well-known voice-grade telephone service that is based on analog signal transmission common before the advent of advanced forms of telephony such as Integrated Services Digital Network (ISDN), cellular telephone systems, and voice over Internet Protocol (VoIP). It remains the basic form of residential and small business service connection to the telephone network in many parts of the world. The term reflects the technology that has been available since the introduction of the public telephone system in the late 19th century, in a form mostly unchanged despite the introduction of Touch-Tone dialing, electronic telephone exchanges and fiber-optic communication into the public switched telephone network (PSTN). The cellular data network 116 includes the well-known LTE and WIMAX wireless data networks, which are packet-switch networks that route data packets using the afore-mentioned Internet-based protocols, as well as over-the-air protocols. The cellular voice network 120 is a wireless, circuit-switched network, such as a second generation CDMA or GSM network, for supporting wireless voice calls and limited circuit-switched data transmissions. Such networks are well known in the art.

Figure 2:
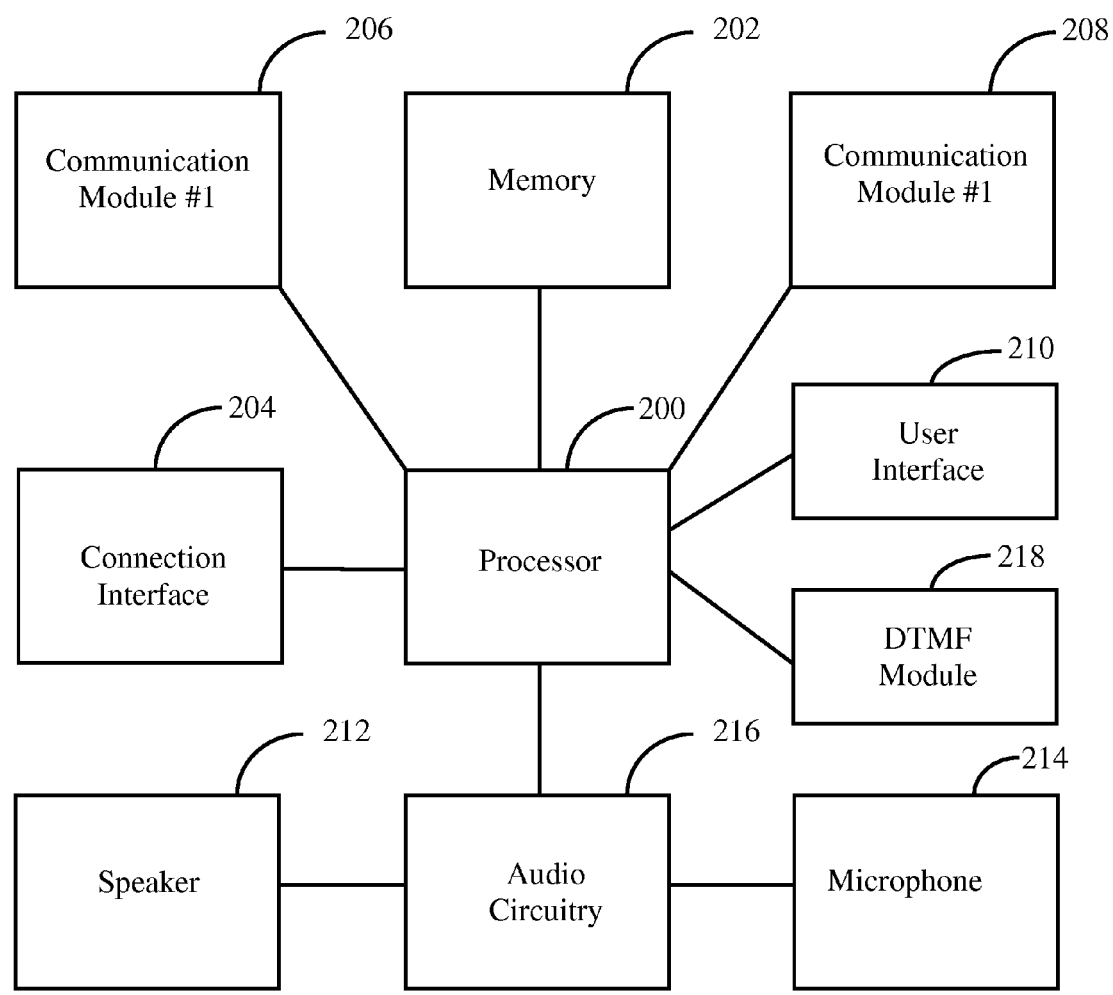
FIG. 2 illustrates a functional block diagram of one embodiment of the alarm event communication module (AECM) shown in FIG. 1.

FIG. 2 illustrates a functional block diagram of one embodiment of the AECM 112. Shown are processor 200, memory 202, connection interface 204, communication module 206, communication module 208, user interface 210, speaker 212, microphone 214, audio circuitry 216, and DTMF encoder/decoder 218. It should be understood that in other embodiments, not all of functional blocks shown in FIG. 2 are necessary for operation of the AECM 112, that the functionalities of some modules may be incorporated into other modules/circuitry, and that some functional blocks (such as a power supply) have been omitted for purposes of simplicity.

Processor 200 provides general operation of the AECM 112 by executing processor-executable instructions stored in one or more processor-executable media, such as memory 202. As used herein, the term "processor" comprises any of multipurpose, programmable microprocessors or microcontrollers that incorporate a central processing unit (CPU), or processor core, on an integrated circuit or ASIC that accepts digital or analog data as an input, processes it according to the processor-executable instructions stored in memory 202, and provides results as an output. Processors may further comprise one or more electronic memories (i.e., ROM, RAM, EEPROM, flash, etc.) and programmable input/output peripherals (i.e., analog-to-digital converters, UARTS, timers, etc.). For example, a typical microcontroller that may be used to perform the functionality of AECM 112 comprises an APX-101 AVR microcontroller from Atmel Corporation of San Jose, Calif. Other major suppliers of microcontrollers and microprocessors include Intel Corporation of Santa Clara, Calif. and MicroChip Technology, Inc. of Chandler, Ariz. Typically, a relatively low-cost microprocessor/microcontroller is used, as the AECM 112 is generally a consumer product.

Memory 202 is used to store the processor-executable instructions for general operation of AECM 112, as well as to store certain information used by processor 200 to determine a communication method or technique for transmission and/or reception of information to/from the remote monitoring center 108 and/or the third party intermediary 110. For example, memory 202 may store one or more lists of event codes, each list corresponding to a particular security product manufacturer, such as Ademco, 2Gig, Honeywell, etc. In one embodiment, memory 202 stores a corresponding indication of one or more preferred communication techniques to transmit the event code if received from the base station 100 via the connection interface 204. For example, a preferred method of communications for urgent events might comprise sending a data message over the Internet and then via cellular data network 116 if the communication over the Internet fails. Alternatively, a communication method code could be stored in association with each event code. For example, a communication method code of "1" could be assigned to event codes labeled as urgent, while non-urgent event codes could be assigned a communication method code of "2", where communication method 1 comprises a reliable, fast method of communication while communication method 2 comprises a cost-effective method of communications. Other information could be stored in association with event codes, such as a preferred order of a list of communication methods over which to transmit information. For example, for urgent event codes, processor 200 may be instructed to attempt communication with remote monitoring center 108 first via the Internet, then with third party intermediary 110 via cellular data network 116, then with third party intermediary 110 via cellular voice network 120 and, finally, with remote monitoring center 108 via POTS network 114. For non-urgent event codes, processor 200 may be instructed to communicate with remote monitoring center 108 first via the Internet, then with remote monitoring center 108 via POTS network 114. Contact information relating to remote monitoring center 108 and the third party intermediary 110 may be stored by memory 202, such as one or more IP addresses, email addresses, or telephone numbers.

Other information can be associated with event codes as well, such as the names and contact information of family members or friends to be contacted in the case of receiving certain event codes from base station 100. For example, for any event code designated as urgent as stored in memory 202, a phone number or email address could be stored in association with such urgent event codes so that the processor 200 transmits a message to friends or family using the contact information when such event codes are received. In the case of multiple contacts, an indication of priority could also be stored, i.e., the processor 200 would attempt to send a message to the first person in a list of contacts, followed by the second person in the list, and so on. In another embodiment, an alphabetical or numerical code is assigned to each contact, indicating an order in which each contact should be contacted by the processor 200. In another embodiment, multiple ways to contact each person could be stored. For example, in case of an urgent event, a homeowner could store his telephone number and his email address, and store an indication of a first preferred method of communication. In this example, the homeowner could indicate that a preferred method of communication is via telephone. When an urgent event code is received by processor 200, it could contact the homeowner via the telephone number stored in memory 202, and provide, for example, a pre-recorded message indicative of the type of alarm event associated with the received event code. Such pre-recorded messages may also be stored by memory 202.

Memory 202 comprises one or more information storage devices that can be accessed by processor 200 and may include one or both of volatile and nonvolatile media, and/or removable and/or non-removable media, but excludes propagated signals. By way of example, and not limitation, such as volatile and/or nonvolatile, removable and/or non-removable media implemented in any method or technology for storage of information such as processor-executable instructions, data structures, program modules or other data. Memory 202 includes, is not limited to RAM, ROM, EEPROM, flash memory, magnetic disk storage or other magnetic storage devices, optical, or other type of memory technology typically used in limited-space, consumer electronic applications. In typical applications, memory 202 comprises more than one memory type, for example, both RAM memory as well as Flash memory.

User interface 210 is coupled to processor 200 and is used, in one embodiment, to allow consumers, service personnel, or manufacturing personnel to interact with the AECM 112, for example, assigning an urgency or priority level to one or more event codes (i.e., whether a particular event code is a "high" priority, "low" priority, a "high", "medium", or "low" priority, a priority in accordance with a numbering scheme, i.e., a "1" being a highest urgency and a "5" being a lowest urgency, and numbers "2", "3", and "4" indicating urgency levels therebetween).

For any event code, the user interface 210 may also be used to enter contact information related to one or more remote monitoring centers or third parties, names and contact information relating to friends or family members, etc. As an example, user interface 210 may be used by a homeowner or installation technician to enter contact information of one or more remote monitoring centers or third party intermediaries and assign this information to a particular type of communication technique. For example, the name and telephone number of remote monitoring center 108 and third party intermediary 110 could be entered and stored by memory 202, along with an IP address associated with each entity. Also, an indication could be entered that associates the contact information with a particular type of communication technique. Thus, the telephone number associated with remote monitoring center 108 and the third party intermediary 110 could each be stored with an indication that the telephone number information is to be used for POTS communications and cellular voice communications, while IP addresses associated with each entity could be stored with an indication that they are to be used for Internet and cellular data communications.

In addition, for each communication technique available to the AECM 112, the homeowner or technician could assign a priority, indicating an order for the processor 200 to attempt communications when urgent event codes are received from base station 100. The homeowner or technician may also assign a different priority hierarchy to the available communication techniques for when non-urgent event codes are received. For example, for an AECM 112 that provides for Internet, POTS, cellular data, and cellular voice communications, for event codes that have been designated as urgent, the homeowner or technician may indicate that processor 200 should send communications via the Internet 114 first, followed by cellular data network 116, then using POTS 118, and then by the cellular voice network 120. For non-urgent event codes, the priority hierarchy could indicate that processor 200 should try the Internet 114 first, followed by POTS 118. If both Internet and POTS fail, then communications may be attempted one or more times at one or more future times or, at some point, disregarded altogether.

The priority or urgency may be assigned on an individual basis to the event codes stored in memory 202. For example, the user interface 210 may be used to access a list of event codes relating to the particular brand of base station 100 used in conjunction with AECM 112. For each event code, an urgency or priority code could be assigned (or none), indicating an urgency of an event associated with each event code. In this example, a "High" priority status is assigned to event codes indicating an imminent threat to life or property, while a "Low" priority is assigned to event codes that do not indicate an imminent threat to life or property. Event codes that are not assigned a priority may default to "Low" priority.

User interface 210 may comprise one or more touchscreens, pushbuttons, switches, sensors, and/or keypads that generate electronic signals for use by processor 200 upon initiation by a user. User interface 210 may, alternatively or in addition, comprise one or more display devices, such as one or more liquid crystal displays (LCDs), one or more light emitting diode displays (LEDDs), one or more light emitting diodes (LEDs), light arrays, or any other type of visual display. Of course, the aforementioned items could be used alone or in combination with each other and other devices may be alternatively, or additionally, used.

Speaker 212, microphone 214, and audio circuitry 216 may be used in an embodiment where AECM 112 is configured to provide two-way voice communications with the remote monitoring center 108 and/or third party intermediary 110, or to some other party. The audio circuitry 216 is configured to amplify audio information received by one of the communication modules for broadcast to a user via the speaker 212. Speaker 212 is configured to enable a user of AECM 112 to hear audible information from speaker 212 at any convenient distance away from AECM 112, and may comprise any one of inexpensive piezoelectric or cone-type speakers available. The microphone 212 may comprise virtually any inexpensive piezoelectric or condenser-type microphone. The microphone is configured to receive audio signals, typically in the form of human speech, and convert the audio signals into electric signals for use by audio circuitry 216. Audio circuitry 216 is further configured to filter, amplify, and digitize the audio signals for use by processor 200 and/or the communication modules. Audio circuitry 216 may comprise a number of discrete electronic components, such as resistors, transistors, and capacitors, an integrated circuit specially designed for such audio applications, or a combination of both. Such circuitry is well known to those skilled in the art.

Connection interface 204 is electronically coupled to processor 200 and comprises a connector and/or electronic circuitry necessary for the AECM 112 to communicate with the base station 100 via wired and/or wireless communication channels. Typically, connection interface 204 comprises hardware, software and/or firmware necessary to transmit and receive information sent via one or more commonly-used network protocols, such as TCP/IP, RS-232, DTMF tones, etc. In one embodiment, connection interface 204 comprises, simply, an RJ-11 jack used for POTS communications. Alternatively, or in addition, connection interface 204 could comprise a wireless transceiver configured to communicate using one or more well-known wireless communication standards, such as 802.11, BlueTooth, Zigbee, Z-Wave, DECT, GPRS, GSM, wireless radio, etc. Generally, connection interface 204 is configured to receive alarm event information from the base station 100 in the form of event codes. However, it may also be configured to allow two-way communications with the base station 100, such as in the case where an event code may indicate a desire to open a two-way voice communications between the base station 100 and the central monitoring station 108 or the third party intermediary 110.

Communication modules 206 and 208 each comprise circuitry, software, and/or firmware to allow AECM 112 to communicate with either remote monitoring center 108, third party intermediary 110, or both, using different methods of communication. In one embodiment, a "communication method" or "communication technique" is defined by which network is used by processor 200 to send and/or receive information. In another embodiment, a "communication method" or "communication technique" is defined by the protocol that is used to send and receive information. For example, a first communication method or technique might comprise transmission and/or reception of information using the TCP/IP protocol while a second communication method or technique could comprise transmission and/or reception of voice information using a voice-over-IP (VOIP) protocol. In this example, both protocols may be transmitted or received over Internet 114. Communication methods may include wired Ethernet, wireless Ethernet, SMS, POTS, VOIP, cellular data, and cellular voice. It should be understood that although the AECM 112 shown in FIG. 2 shows only two communication modules, it should be understood that in other embodiments, a greater, or fewer, number of communication modules could be present. For example, AECM 112 may comprise a single communication module and be configured to transmit using data using the TCP/IP protocol and VOIP.

Either of the communication modules 206 or 208 can comprise one of a cellular communication module capable of communicating over cellular voice network 120, a cellular data module capable of communicating over cellular data network 116, a communication module capable of communicating over the POTS network (including an RJ-11 output jack), or a module capable of communicating over Internet 114 (which may include an RJ-45 Ethernet jack). Each module comprises hardware, software, and/or firmware known by those skilled in the art, typically comprising a customized ASIC, supporting circuitry, and firmware, and each is widely available commercially. Typically, such capabilities can be combined into one communication module. For example, an MDM9625 chip is offered by Qualcomm Incorporated of San Diego, Calif., that offers cellular voice via TD-SCDMA, and GSM/Edge protocols, and cellular data in the form of LTE, HSPA+, or 1×DO, as well as TCP/IP for communication via the Internet 114 via integrated Wi-Fi (802.11) capabilities. Thus, AECM 112 may be able to communicate using two or more communication techniques with a single communication module.

The DTMF encoder/decoder 218 comprises circuitry and/or software/firmware to generate DTMF tones, typically used to transmit information to remote monitoring center 108 or third party intermediary 110 over the POTS network 118 or cellular voice network 120, and to decode tones received from remote monitoring center 108 or third party intermediary 110. For example, the DTMF encoder/decoder 218 may provide an indication that an "off-hook" condition has been recognized or that a communication has been terminated by the remote monitoring center 108. DTMF encoder/decoder 218 may comprise a separate, integrated circuit or its functionality may be incorporated into processor 200 executing instructions stored in memory 202, as is well known in the art. In another embodiment, the DTMF encoder/decoder functionality resides in one of the communication modules, for example, provided by a POTS communication module.

In addition, or as an alternative, to the DTMF encoder/decoder 218, the AECM 112 may comprise a Ringing SLIC module (subscriber line interface circuit). The SLIC module typically interfaces the twisted pair cable of a POTS local loop to the public switched telephone network (PSTN). The SLIC module typically performs multiple tasks, such as analog-to-digital and digital-to-analog conversion of voice, off-hook detection, ring supervision, line integrity tests, and other BORSCHT functions. In some telephone exchange designs, the SLIC module generates ringing current and can decode DTMF signals. A subscriber loop carrier or subscriber line carrier (SLC) provides telephone exchange-like telephone interface functionality. An SLC remote terminal is typically located in an area with a high density of telephone subscribers, such as a residential neighborhood, that is remote from the telephone company's central office. Two or four T1 circuits (depending on the configuration) connect the SLC remote terminal to the central office terminal (COT), in the case of a universal subscriber loop carrier (USLC). An integrated subscriber loop carrier (ISLC) has its T-spans terminating directly in time division switching equipment in the telephone exchange.

The SLIC module may further be configured to provide CID Handshake and Kissoff tone detection and generation. A CID handshake involves a particular tone sequence that is produced by a receiver at the remote monitoring center 108 or the third party intermediary 110. The purpose of the CID handshake is to signal the communication module within AECM 112 that the communication channel is ready. The handshake tone sequence is emitted by the receiver after going off-hook and delaying an interval of at least 0.5 seconds but typically no greater than 2.0 seconds. This time allows the POTS network connection to settle before the communication process begins. In addition, the SLIC module may have the ability to detect the "Kissoff Tone" from the receiver. The kissoff tone is used to tell the communication module within the AECM 112 that a message has been received successfully. The frequency of the tone is typically 1400 Hz and is typically transmitted for a minimum of 750 msec.

Further, the SLIC module may have the ability to generate a DMTF "9" tone to automatically disconnect the AECM 112 from the remote monitoring center 108 or third party intermediary 110 when the wireless signal has been disconnected.

Figure 3:
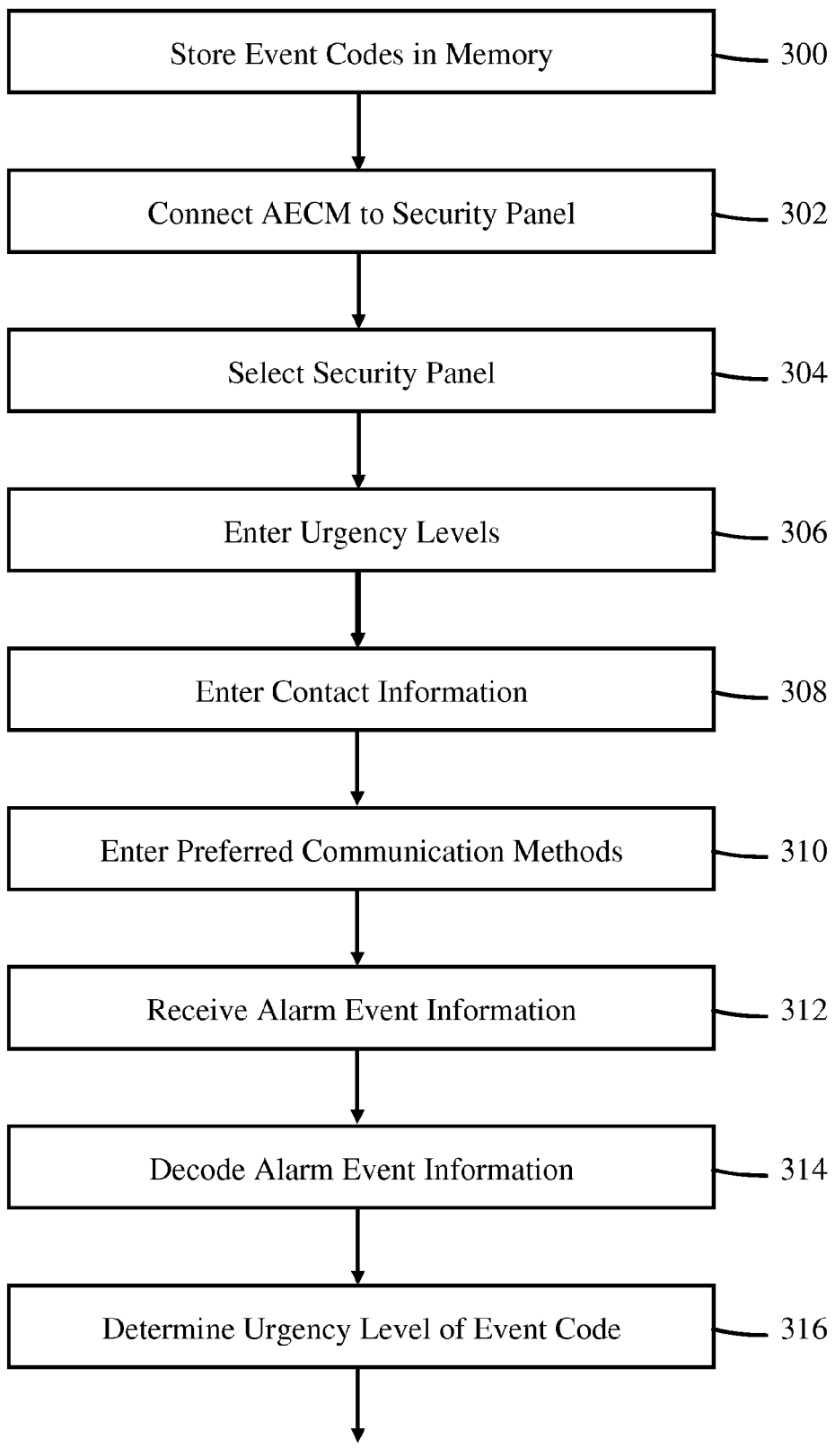
FIG. 3 is a flow diagram illustrating one embodiment of a method for transmitting messages from a security panel to a remote location in accordance with the teachings herein.

FIG. 3 is a flow diagram illustrating one embodiment of a method for transmitting alarm event information from a security panel to a remote location. The method is implemented by a processor, such as processor 200 shown in FIG. 2, located within AECM 112, executing processor-executable instructions stored in memory 202 as shown in FIG. 2. It should be understood that in some embodiments, not all of the steps shown in FIG. 3 are performed and that the order in which the steps are carried out may be different in other embodiments. It should be further understood that some minor method steps have been omitted for purposes of clarity.

At block 300, in one embodiment, a number of event codes are stored in memory 202 and, in one embodiment, a short description of an event associated with each event code. This is typically done during manufacture of AECM 112. Several sets of event codes may be stored, each set representative of codes used by particular security panel manufacturers. The event codes and/or corresponding information may be entered via the user interface 210, or by connecting the AECM 112 to a computer via, for example, an Ethernet or serial data connection, and programming memory 202 using techniques well known in the art. Processor-executable instructions used for general operation of AECM 112 may also be stored within memory 202 at this point.

At block 302, the AECM 112 is connected to a base station 100 via connection interface 204.

At block 304, a user of AECM 112 may request a list of security panel manufactures that the AECM 112 supports via user interface 210. The request is sent to the processor 200, where it retrieves a list of manufacturers from memory 202 and provides the list to the user interface 210. The user may select a panel manufacturer from a list of panel manufacturers displayed by the user interface 210. The selection is provided to the processor 200 and an indication of the selection is then stored in memory 202. Thereafter, the AECM 112 decodes alarm event information received from the base station 100 in accordance with the selected manufacturer to produce event codes.

At block 306, in one embodiment, the user enters urgency or priority information into AECM 112 using the user interface. In another embodiment, the urgency or priority information is entered during the manufacturing stage. The urgency or priority information indicates whether an event code or series of event codes is/are "urgent" or otherwise determined by the user to warrant a prioritized status. The priority information may comprise a "level" or numerical rating, such as on a scale from 1 to 3, 1 to 5, 1 to 10, alphabetic, alphanumeric, or any other designation of priority. In another embodiment, event code(s) is/are simply designated as either "urgent" or "non-urgent". The priority information is typically entered via the user interface 210 and stored by the processor 200 in memory 210 in association with event codes associated with the selected security panel manufacturer. For example, a user could designate any Ademco contact ID event codes from 100 to 136 as "urgent" (as shown in Exhibit A, these event codes indicate "urgent" events, such as medical, fire, smoke, and break-ins), and any other event code as "non-urgent". In another embodiment, 3 or more levels of priority could be assigned to event codes.

At block 308, the user may enter contact information, such as a telephone number, email address, or IP address associated with the remote monitoring center 108 and/or the third party intermediary 110. The user may also enter other contact information, such as one or more telephone numbers, email addresses, or instant messaging IDs of people that the user would like to receive notifications when certain events codes are received by the AECM 112. The user may further prioritize this information, for example, to have AECM 112 contact a number of people in a predetermined order and, for one or more contacts, designate a method of communication to contact each person. For each person having more than 1 contact information (i.e., any contact having both a phone number and instant message ID), the user may specify a preferred method to send information or a hierarchy of methods to try first.

At block 310, the user may enter information into AECM 112 using user interface 210, designating a preferred list of communication methods available to AECM 112 for at least some of the urgency levels or priority levels assigned to the event codes. In another embodiment, this information may be entered during the manufacturing process. In this embodiment, a list of preferred communication methods may be entered, some of which may not be available in every location to the AECM 112. For example, the AECM 112 may be capable of cellular voice, cellular data, POTS, and wireless Ethernet. A preferred, prioritized list may be stored, indicating the afore-mentioned methods, in order, for AECM 112 to attempt if an urgent event code is received. However, when AECM 112 is installed, it may not have access to cellular data.

In either case, the communication methods are provided to processor 200 and stored in memory 202. For example, if AECM is capable of communicating via the POTS network 118, via the cellular voice network 120, and the cellular data network 116, then the user could designate a preferred order in which to communicate based on an urgency level or priority level assigned to the event codes. For example, for event codes which have been designated as "urgent", the user could specify that such event codes should be transmitted first using the cellular data network 116, then by the POTS network 118, and then by the cellular voice network 120. For example, upon receipt of an event code having been designated "urgent", AECM 112 attempts to transmit the event code over the cellular data network 116. If AECM 112 does not receive an acknowledgment that the event code has been successfully received, then AECM 112 attempts to transmit the event code using the POTS network 118. Failing that, the AECM 112 attempts to transmit the event code using the cellular voice network 120. It should be understood that for each communication method attempted, AECM 112 could, in some embodiments, attempt to retransmit a predetermined number of times using the same communication method before attempting transmission using the next communication method in the communication hierarchy designated by the user.

At block 312, during normal use, AECM 112 may receive alarm event information from the base station 100, typically in the form of DTMF tones. The alarm event information comprises at least one event code indicative of an event that has been sensed by one of the sensors 102, 104, and/or 106.

At block 314, processor 200 decodes the alarm event information to retrieve the event code, using either DTMF encoder/decoder 218 or executable instructions stored in memory 202. Decoding is performed in accordance with the type of security panel being used, for example, using decoding techniques based on SIA, 4-2, Radionics, Tunstall, or others.

At block 316, in one embodiment, the processor 200 determines a priority or "urgency" level of the event code by accessing memory 202 and determining a priority/urgency level associated with the event code, as designated previously at block 306. In another embodiment, processor 200 determines the urgency/priority of the received event code by comparing the event code to predetermined criteria stored in memory 202. For example, the predetermined criteria could comprise the number 199, and any event code less than 199 is determined to be an urgent event code, while any event code greater or equal to 199 is determined to be a non-urgent event code. Other thresholds or ranges are possible. For example, event codes falling within a certain range of values may be determined to be urgent, even or odd numbered event codes determined to be either urgent or non-urgent, etc. In other embodiment, the criteria could simply comprise a list of communication methods available to AECM 112 in a listing of preferential order. In this embodiment, the event code retrieved at block 314 is used by processor 200 to look up a matching event code in memory 202 and determining an associated list of communication methods assigned to that particular event code.

At block 318, the processor 200 determines a first communication method to transmit the event code. For example, the processor 200 may be configured to transmit all event codes designated as "urgent" or "high priority" over the Internet 114 in the form of one or more TCP/IP packets. In another embodiment, processor 200 selects a communication method based on a communication method indication stored in association with the particular event code received. Processor 200 may select a low-cost communication method, such as data over Internet 114, if the event code is designated as non-urgent or low priority. In one embodiment, processor 200 determines the first communication method by evaluating a list of preferred communication techniques stored in memory 202, then attempting to communicate using the most-preferred communication method. If a particular communication method is not available to AECM 112, for instance if no cellular data is available in the location where AECM is installed, then processor 200 will not attempt communications using that particular communication method and move to the next-preferred communication method.

At block 320, the processor 200 determines contact information associated with the communication method, in this case an IP address associated with remote monitoring center 108, by accessing memory 202.

At block 322, processor 200 re-encodes the decoded event code in a format compatible with the security panel, such as Ademco contact ID, SIA, 4-2, Radionics, Tunstall, or others. In one embodiment, processor 200 re-encodes the decoded event code based on formats associated with the security panel selected by the user back in block 304.

At block 324, the processor 200 encodes the re-encoded event code into an encoded message in accordance with a format compatible with the first communication method, in this example, into one or more TCP/IP packets destined for the IP address associated with the remote monitoring center 108. In other embodiments, encoding may be performed in accordance with any number of wireless communication protocols, such as those associated with any variety of CDMA, GSM, Wi-Fi, Bluetooth, etc.

At block 326, the processor 200 provides the encoded message to communication module 206, for transmission to the remote monitoring center 108, in this case via the Internet 114. As is well known in the art, the communication module 206, in this embodiment, sends the TCP/IP packets to the Internet 114 via a modem and/or Local Access Network (LAN) typically located in the same structure as the AECM 112.

At block 328, in one embodiment, processor 200 determines if a homeowner or some other person should be notified of a potential event occurring at the premises where base station 100 is located. Such information may be stored in memory 202, storing contact information for one or more persons to be contacted in case of receipt of certain event codes. For example, a homeowner may wish to be notified via cell phone and text message whenever an urgent event code has been received by AECM 112. In addition, the homeowner desires his wife to also receive an alert when an urgent event code has been received. Further, for non-urgent event codes, the homeowner may provide information for processor 200 to alert the homeowner only, and using a least-cost communication method. Processor 200 may retrieve the contact information from memory whenever an urgent event code has been received, and then send an alert message to the persons identified in memory 202, via the contact information associated with the persons identified in memory 202. In one embodiment, processor 200 sends an alert message in conformance with a selected communication method, also associated with the persons stored in memory 202. For example, a homeowner may program AECM 112 to alert the homeowner first by a cellular phone call over cellular voice network 120 and, in addition, via text message over cellular data network 116.

Processor 200 may transmit one of several prerecorded voice message stored in memory 202 to persons wishing to be contact via a voice call, each prerecorded message indicative of a particular event code.

At block 330, the processor 200 determines if the encoded message transmitted at block 324 has been successfully received by the intended recipient. An acknowledgment of successful transmission may take the form of an ACK in a TCP/IP header for data or VOIP messages transmitted over the Internet 114 or cellular data network 116, or a Kissoff tone received in a POTS or cellular voice call. Other forms of acknowledgment are well-known in the art. If no acknowledgement signal is received by the processor 200 within a predetermined time period, processing may loop back to block 324, where the encoded message is transmitted again using the first communication method. This process may be repeated for a predetermined number of times, before processor 200 attempts to send the encoded message using the next-best communication method, as determined by the event code urgency/priority information stored in memory 202 and/or predetermined communication method hierarchy defined for all urgent events. In this case, processing returns to block 318, where blocks 318-324 are repeated using a second communication method defined in the hierarchy. These steps may be repeated if the second communication method fails, wherein processor 200 will attempt to transmit the encoded message using a third communication method, as prescribed by information stored in memory 202.

At block 332, the processor 200 may receive a "Kissoff" tone from the remote monitoring center 108 or the third party intermediary 110, indicating that the communication session has ended.

At block 334, the processor may provide a status message to base station 100, via connection interface 204, indicative of whether the event code was successfully transmitted to either remote monitoring center 108 or third party intermediary 110. Such an indication may result from receiving the Kissoff tone or other acknowledgment from remote monitoring center 108 or third party intermediary 110 and may comprise an encoded message in accordance with the alarm protocol used by base station 100. In response, security panel may provide an indication of successful transmission by illuminating a light located on base station 100 or sounding an audible alert via a speaker located within base station 100.

Figure 4:
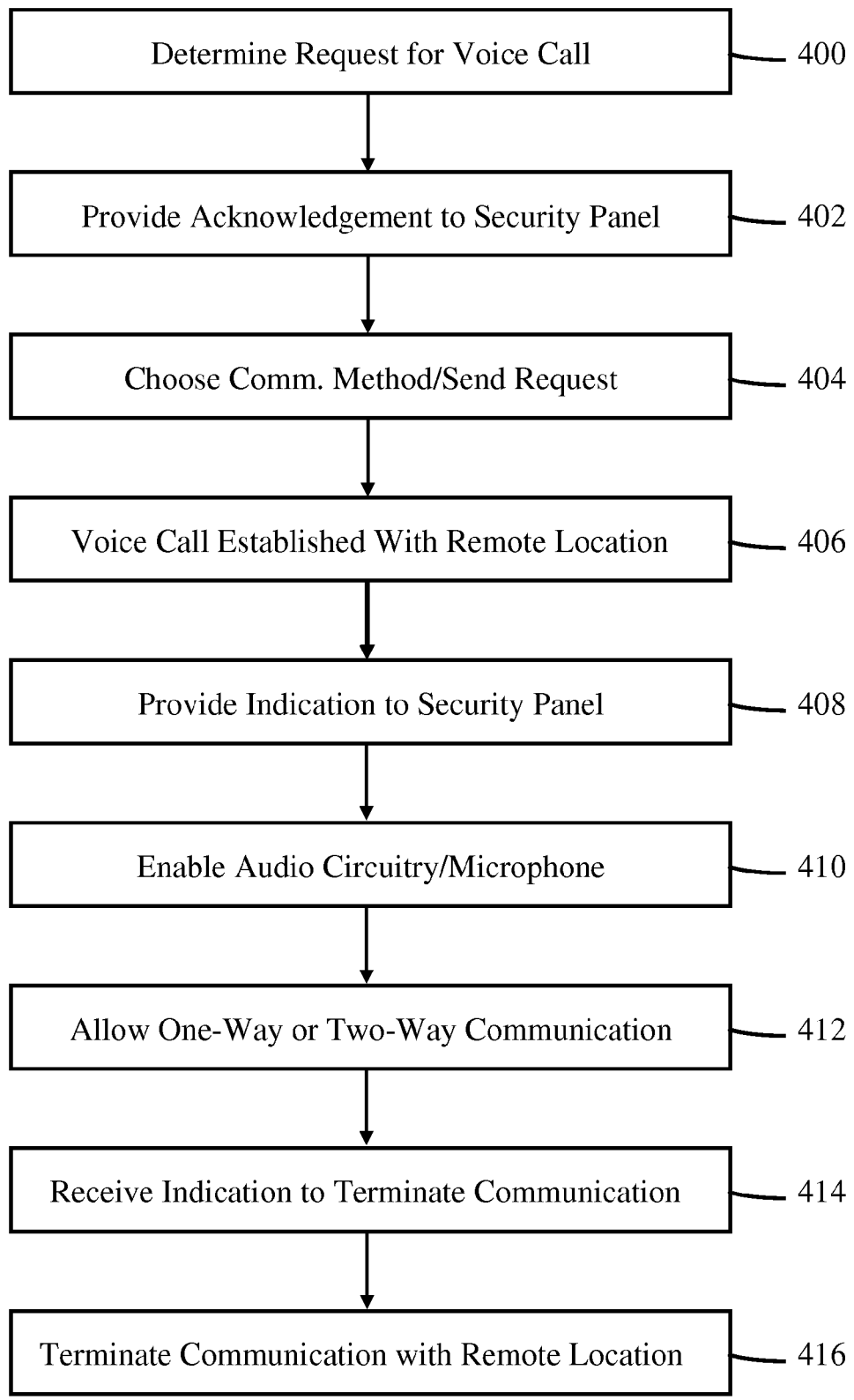
FIG. 4 is a flow diagram of another embodiment of a method for transmitting alarm event information from a security panel to a remote location.

FIG. 4 is a flow diagram of another embodiment of a method for transmitting alarm event information from a security panel to a remote location. In this embodiment, AECM 112 comprises audio circuitry 216, microphone 214, and speaker 212 that permits a two-way voice communication with the remote location 108 or the third party intermediary 110. The method may be performed in conjunction with the method of FIG. 3, after an event code has been transmitted to remote monitoring center 108 and/or third party intermediary 110.

At block 400, after receiving an event code from base station 100, as described with respect to the method of FIG. 3, above, processor 200 determines if a second event code is present, the second event code associated with a desire to open a voice communication with remote monitoring center 108 or third party intermediary 110. Such a determination may be made by looking up the event code in memory 202, where associated information may be stored, indicating that a voice call is desired. For example, event code 606 is designated as a "Listen to follow" instruction used in the Ademco contact ID reporting methodology. When remote monitoring center 108 or third party intermediary 110 receives this code, it knows it is a request by base station 100 to open a communication channel that enables remote monitoring center 108 or third party intermediary 110 to at least listen to events occurring at the location of base station 100. In another embodiment, two-way voice communications are enabled.

In another embodiment, the event code associated with a desire for voice communications is received after an initial event code has been received by AECM 112 and transmitted. The initial event code acts as a qualifying event whereby no voice communications are possible without first detecting the initial event code.

At block 402, in response to receiving the second event code at block 400, processor 200 may provide an acknowledgment to base station 100, indicating that the event code(s) was/were successfully received. The acknowledgement may indicate that a voice channel is in the process of being opened by AECM 112.

At block 404, after determining that a voice communication is desired, processor 200 encodes a request and sends the encoded request using a communication method used to facilitate voice calls, i.e., either an analog voice call over POTS network 118, a VOIP call over Internet 114, a VOIP call over cellular data network 116, or a cellular voice call over cellular voice network 120. In another embodiment, processor 200 encodes and transmits the event code using a communication method not necessarily associated with a voice call. The communication method chosen to establish a voice call need not be the same communication method selected to transmit the first event code. For example, a first event code could be encoded and transmitted as a data message over Internet 114, while the second event code indicative of a desire to open a voice communication, may be transmitted over a cellular voice network. In any case, processor 200 may select a particular communication method based on criteria stored in memory 202, such as an indication instructing processor 200 to transmit the event code(s) indicative of an event occurring at or within the premises where base station 100 is located, and a desire to open a voice communication channel, using a pre-selected communication method. For example, when an event code equal to 606 is received, processor may determine, by looking up event code 606 in a table stored in memory 202, that a voice communication channel should be established using, first, a POTS connection and if that fails, or is unavailable, a cellular voice channel.

At block 406, AECM 112 establishes a voice communication with remote monitoring center 108/third party intermediary 110 in accordance with the criteria stored in memory 202. In one embodiment, this indication comprises CID handshake tones. Such establishment of a voice communication is well-known in the art.

At block 408, in one embodiment, processor 200 may provide an indication to base station 100 via connection interface 204 that a voice communication is open to base station 100, typically in the form of CID handshake tones. The base station 100 may do nothing with the indication if base station 100 is not configured to allow voice communications.

At block 410, processor 200 enables audio circuitry 216, including microphone 214 and/or speaker 212, to allow for one-way or two-way audio communications between remote monitoring center 108/third party intermediary 110. Processor 200 may also provide an indication that such a voice channel is active, typically by lighting an illumination device, such as an LED, on the housing of AECM 112.

At block 412, AECM 112 allows either one-way or two-way communications to occur between remote monitoring center 108/third party intermediary 110 and base station 100. Processor 200 encodes/modulates audio signals received from audio circuitry 216 and transmits them to remote monitoring center 108/third party intermediary 110 in accordance with the security panel communication protocol and communication method protocol chosen by processor 200. In an embodiment where two-way audio is provided, processor 200 decodes/demodulates signals received from remote monitoring station 108/third party intermediary 110 containing voice information from a dispatcher located at remote monitoring station 108/third party intermediary 110 and provides such voice information to speaker 212 via audio circuitry 216.

At block 414, the user of AECM 112 may indicate a desire to terminate the voice communication by operating user interface 210 which, in turn, provides an electrical signal to processor 200 recognized as a desire to terminate the voice communication.

At block 416, processor 200 terminates the voice communication by transmitting a "kissoff" tone to remote monitoring station 108/third party intermediary 110. In another embodiment, processor 200 simply disables the communication module used to transmit and receive information during the audio communication.

Figure 5:
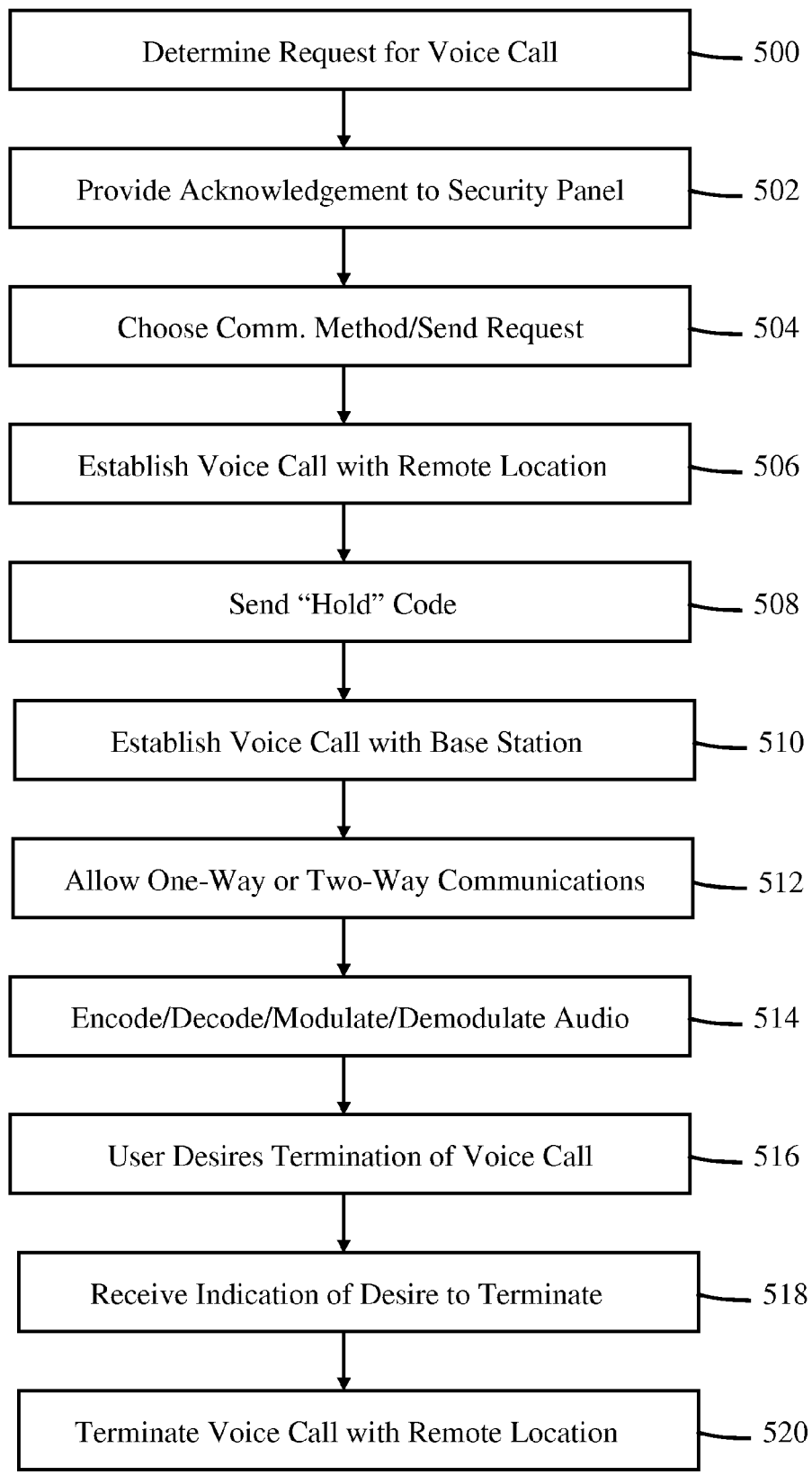
FIG. 5 is a flow diagram of yet another embodiment of a method for transmitting alarm event information from a security panel to a remote location.

FIG. 5 is a flow diagram of yet another embodiment of a method for transmitting alarm event information from a security panel to a remote location. In this embodiment, a one-way or two-way audio channel is opened between base station 100 and remote location 108/third party intermediary 110, using AECM 112 as a conduit.

At block 500, after receiving at least one event code from base station 100, as described with respect to the method of FIG. 3, above, processor 200 determines if subsequent event code has been received, the subsequent event code associated with a desire to open a voice communication with remote monitoring center 108 or third party intermediary 110. Such a determination may be made by looking up the event code in memory 202, where associated information may be stored, indicating that a voice call is desired as described above with respect to block 400.

In another embodiment, the subsequent event code associated with a desire for voice communications is received after at least one previous event code has been received by AECM 112 and transmitted to a remote location. In one embodiment, one of the previous event codes acts as a qualifying event whereby no voice communications are possible without first detecting a previous event code.

At block 502, in response to receiving the event code(s) at block 500, processor 200 may provide an acknowledgment to base station 100, indicating that the event code(s) was/were successfully received. The acknowledgement may indicate that a voice channel is in the process of being opened by AECM 112. The acknowledgment may also serve to place base station 100 in a "stand-by" state to wait for a voice communication channel to be opened by AECM 112.

At block 504, after determining that a voice communication is desired, processor 200 encodes/modulates a request and sends the encoded/modulated request using a communication method used to facilitate voice calls, i.e., either an analog voice call over POTS network 118, a VOIP call over Internet 114, a VOIP call over cellular data network 116, or a cellular voice call over cellular voice network 120. In another embodiment, processor 200 encodes and transmits the event code using a communication method not necessarily associated with a voice call. For example, the event code could be encoded and transmitted as a data message over Internet 114. The communication method chosen to establish a voice call need not be the same communication method selected to transmit the first event code. For example, a first event code could be encoded and transmitted as a data message over Internet 114, while the second event code indicative of a desire to open a voice communication, may be transmitted over a cellular voice network. In any case, processor 200 may select a particular communication method based on criteria stored in memory 202, such as an indication instructing processor 200 to transmit the event code(s) indicative of an event occurring at or within the premises where base station 100 is located, and a desire to open a voice communication channel, using a pre-selected communication method. For example, when an event code equal to 606 is received, processor may determine, by looking up event code 606 in a table stored in memory 202, that a voice communication channel should be established using, first, a cellular communication channel and if that fails, or is unavailable, a POTS communication channel.

At block 506, AECM 112 attempts to establish a voice communication with remote monitoring center 108 or third party intermediary 110 in accordance with the criteria stored in memory 202 via a communication module configured to support the method of communications selected by processor 200. In one embodiment, this indication comprises CID handshake tones. Such establishment of a voice communication is well-known in the art. Establishment of a voice communication may comprise establishing a voice connection with remote monitoring center 108 or third party intermediary 110 and, in one embodiment, having a dispatcher actually accept the call and begin at least listening to events occurring proximate to base station 100. For example, AECM 112 may establish a voice connection with remote monitoring center 108 by remote monitoring center "answering" the call and placing the call "on hold" while a dispatcher can be alerted to the presence of the call. The voice communication may be completed when a dispatcher actually begins participating in the call by either listening and/or speaking.

At block 508, in one embodiment, processor 200 sends a "hold" code to remote monitoring center 108 or third party intermediary 110 indicating to remote monitoring center 108 or third party intermediary 110 that a voice communication is still desired after a predetermined time period has elapsed from receiving the event code requesting voice communications, if a dispatcher has not yet accepted the call. Such a "hold" code may be unique to each model of base station 100. In one embodiment, when a user selects a particular type of security panel, for example in setup block 304, described earlier, processor 200 determines what the "hold" code is based on information pre-stored in memory 202 for each model of security panel supported by AECM 112. The "hold" code may be sent at predetermined time intervals independent of the type of security panel selected (for example, to cover all or a majority of security panels, the "hold" code could be transmitted every 30 seconds), or the "hold" code could be sent at predetermined time intervals particular to a security panel model, also pre-stored in memory 202 for each security panel supported by AECM 112.

At block 510, processor 200 may establish audio communications with base station 100, in one embodiment by exchanging one or more CID handshake tones with base station 100 via connection interface 204. In another embodiment, audio communications with base station 100 are already present by virtue of the wired or wireless connection to base station 100 via connection interface 204. Thus, at this point, AECM 112 has established a first audio communication channel with remote monitoring center 108/intermediary 110, as well as a second audio communication channel with base station 100 via connection interface 204. Thereafter, AECM 112 acts as a conduit between remote monitoring center 108/third party intermediary 110 and base station 100.

At block 512, after AECM 112 has established a voice communication channel with remote monitoring center 108/third party intermediary 110 and base station 100, a dispatcher located at remote monitoring center 108/third party intermediary 110 may listen to events occurring in the vicinity of base station 100. In a two-way communication, base station 100 may permit audio information from a user to be transmitted to remote monitoring center 108/third party intermediary 110 via a speaker and/or microphone incorporated into base station 100, or a device in wireless communication with base station 100, such as a wireless, wearable panic button.

At block 514, processor 200 encodes/modulates audio information received by base station 100 and provided to AECM 112 via connection interface 204 for transmission to remote monitoring station 108/third party intermediary 110 using the communication method selected at block 504. Processor 200 may also demodulate/decode signals received from remote monitoring station 108/third party intermediary 110 containing voice information from a dispatcher located at remote monitoring station 108/third party intermediary 110 and provide such demodulated/decoded voice information to base station 100 via connection interface 204. For example, AECM 112 may receive voice signals from a user via base station 100 and connection interface 204, and then encode/modulate the voice signals for transmission to remote monitoring station 108/third party intermediary 110 via a communication module configured for the type of communication method selected by processor 200 at block 504. In addition, AECM 112 may receive cellular voice signals from a dispatcher located at remote monitoring center 110 and demodulate the cellular voice signals to generate voice information in the audio spectrum, then provide the audio information to base station 100 via connection interface 204 for presentation to the user.

At block 516, the user of base station 100 may indicate a desire to terminate the voice communication by providing an indication to the base station 100 which, in turn, generates an indication for AECM 112 to terminate the voice communication. In one embodiment, the security panel generates a "kissoff" tone.

At block 518, the indication to terminate voice communications is received by processor 200 via connection interface 204.

At block 520, processor 200 terminates the voice communication with remote monitoring station 108/third party intermediary 110 by transmitting a termination indication, such as a "kissoff" tone to remote monitoring station 108/third party intermediary 110. In another embodiment, processor 200 simply disables the communication module used to transmit and receive information during the audio communication.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the present invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Exhibit A
ADEMCO CONTACT ID REPORTING
(revised Oct. 1, 2012)

Contact ID reporting takes the following format:

CCCC Q EEE GG ZZZ

CCCC = customer (subscriber account number)
Q = event qualifier, E = new event, R = restore
EEE = event code
GG = partition number 00-08 (always 00 for non-partitioned panels)
ZZZ = zone ID number reporting the alarm (001-099), or user number for open/close reports.
*System status messages (i.e. AC Loss, Low Battery) contain zeros in the ZZZ location.

| SUBSCRIBER ID # | EVENT QUALIFIER Event or Restore | EVENT CODE* | PARTITION # | ZONE OR USER # |
|---|---|---|---|---|
| XXXX | E or R | 000 | 00 | C000 or U000 |

EVENT CODE CLASSIFICATIONS:

Medical:

| | | |
|---|---|---|
| 100 | Medical | Emerg-Personal Emergency-# |
| 101 | Pendant Transmitter | Emerg-Personal Emergency-# |
| 102 | Fail to report in | Emerg-Fail to check in-# |

FIRE ALARMS:

| | | |
|---|---|---|
| 110 | FIRE | Fire-Fire Alarm-# |
| 111 | SMOKE w/VERIFICATION | Fire-Fire Alarm-# |
| 112 | Combustion | Fire-Combustion-# |
| 113 | WATERFLOW | Fire-Water Flow-# |
| 114 | Heat | Fire-Heat Sensor-# |
| 115 | Pull Station | Fire-Pull Station-# |
| 116 | Duct | Fire-Duct Sensor-# |
| 117 | Flame | Fire-Flame Sensor-# |
| 118 | Near Alarm | Fire-Near Alarm-# |

PANIC ALARMS:

| | | |
|---|---|---|
| 120 | Panic Alarm | Panic-Panic-# |
| 121 | DURESS | Panic-Duress- User 000 or duress zone number on low end panels |
| 122 | SILENT | Panic-Silent Panic-# |
| 123 | AUDIBLE | Panic-Audible Panic-# |
| 124 | Duress-Access Granted | Panic-Duress Access Grant-# |
| 125 | Duress-Egress Granted | Panic-Duress Egress Grant-# |

BURGLAR ALARMS:

| | | |
|---|---|---|
| 130 | Burglary | Burg-Burglary-# |
| 131 | PERIMETER | Burg-Perimeter-# |
| 132 | INTERIOR | Burg-Interior-# |
| 133 | 24 HR BURG (AUX) | Burg-24 Hour-# |
| 134 | ENTRY/EXIT | Burg-Entry/Exit-# |
| 135 | DAY/NIGHT | Burg-Day/Night-# |
| 136 | Outdoor | Burg-Outdoor-# |
| 137 | TAMPER | Burg-Tamper-# |
| 138 | Near Alarm | Burg-Near Alarm-# |
| 139 | Intrusion Verifier | Burg-Intrusion Verifier-# |

GENERAL ALARMS:

| | | |
|---|---|---|
| 140 | General Alarm | Alarm-General Alarm-# |
| 141 | Polling Loop Open | Alarm-Polling Loop Open |
| 142 | POLLING LOOP SHORT (AL) | Alarm-Polling Loop Short |
| 143 | EXPANSION MOD FAILURE | Alarm-Exp. Module Tamper-# |
| 144 | Sensor Tamper | Alarm-Sensor Tamper-# |
| 145 | Expansion Module Tamper | Alarm-Exp. Module Tamper-# |
| 146 | SILENT BURG | Burg-Silent Burglary-# |
| 147 | Sensor Supervision | Trouble - Sensor Super. -# |

Exhibit A
ADEMCO CONTACT ID REPORTING
(revised Oct. 1, 2012)

24 HOUR NON-BURGLARY:

| | | |
|---|---|---|
| 150 | 24 HOUR (AUXILIARY) | Alarm-24 Hr. Non-Burg-# |
| 151 | Gas Detected | Alarm-Gas Detected-# |
| 152 | Refrigeration | Alarm-Refrigeration-# |
| 153 | Loss of Heat | Alarm-Heating System-# |
| 154 | Water Leakage | Alarm-Water Leakage-# |
| 155 | Foil Break | Trouble-Foil Break-# |
| 156 | Day Trouble | Trouble Day Zone-# |
| 157 | Low Bottled Gas Level | Alarm-Low Gas Level-# |
| 158 | High Temp | Alarm-High Temperature-# |
| 159 | Low Temp | Alarm-Low Temperature-# |
| 161 | Loss of Air Flow | Alarm-Air Flow-# |
| 162 | Carbon Monoxide Detected | Alarm-Carbon Monoxide-# |
| 163 | Tank Level | Trouble-Tank Level-# |
| 168 | High Humidity | Trouble-High Humidity-# |
| 169 | Low Humidity | Trouble-Low Humidity-# |

FIRE SUPERVISORY:

| | | |
|---|---|---|
| 200 | FIRE SUPERVISORY | Super.-Fire Supervisory-# |
| 201 | Low Water Pressure | Super-Low Water Pressure-# |
| 202 | Low CO2 | Super-Low CO2-# |
| 203 | Gate Valve Sensor | Super.-Gate Valve-# |
| 204 | Low Water Level | Super.-Low Water Level-# |
| 205 | Pump Activated | Super.-Pump Activation-# |
| 206 | Pump Failure | Super.-Pump Failure-# |

SYSTEM TROUBLES:

| | | |
|---|---|---|
| 300 | System Trouble | Trouble-System Trouble |
| 301 | AC LOSS | Trouble-AC Power |
| 302 | LOW SYSTEM BATT | Trouble-Low Battery (AC is lost, battery is getting low) |
| 303 | RAM Checksum Bad | Trouble-Bad RAM Checksum (Restore Not Applicable) |
| 304 | ROM Checksum Bad | Trouble-Bad ROM Checksum (Restore Not Applicable) |
| 305 | SYSTEM RESET | Trouble-System Reset (Restore Not Applicable) |
| 306 | PANEL PROG CHANGE | Trouble-Programming Changed (Restore Not Applicable) |
| 307 | Self-Test Failure | Trouble-Self Test Failure |
| 308 | System Shutdown | Trouble-System Shutdown |
| 309 | Battery Test Fail | Trouble-Battery Test Failure (Battery failed at test interval) |
| 310 | GROUND FAULT | Trouble-Ground Fault-# |
| 311 | Battery Missing | Trouble-Battery Missing |
| 312 | Power Supply Overcurent | Trouble-Pwr. Supp. Overcur.-# |
| 313 | Engineer Reset | Status-Engineer Reset - User # (Restore Not Applicable) |
| 314 | Primary Power Supply Failure | Trouble - Pri Pwr Supply Fail - # (Sent by UL864 Rev 9 Fire panels like FBP) |
| 316 | System Tamper | Trouble - APL System trouble - # |

SOUNDER/RELAY TROUBLES:

| | | |
|---|---|---|
| 320 | SOUNDER/RELAY | Trouble-Sounder/Relay-# |
| 321 | BELL 1 | Trouble-Bell/Siren #1 (Event an Restore) |
| 322 | BELL 2 | Trouble-Bell/Siren #2 (Event an Restore) |
| 323 | Alarm Relay | Trouble-Alarm Relay |
| 324 | Trouble Relay | Trouble-Trouble Relay |
| 325 | Reversing Relay | Trouble-Reversing Relay |
| 326 | Notification Appliance Ckt. # 3 | Trouble-Notification Appl. Ckt#3 |
| 327 | Notification Appliance Ckt. # 4 | Trouble-Notification Appl. Ckt#4 |

SYSTEM PERIPHERAL TROUBLES:

| | | |
|---|---|---|
| R330 | System Peripheral (E355) | Trouble-Sys. Peripheral-# From LRR, ECP data connection to panel. |
| 331 | Polling Loop Open | Trouble-Polling Loop Open |
| 332 | POLLING LOOP SHORT | Trouble-Polling Loop Short |
| 333 | Exp. Module Failure (353) | Trouble-Exp. Module Fail-# ECP Path problem between panel to LRR, etc (new) |
| 334 | Repeater Failure | Trouble-Repeater Failure-# |
| 335 | Local Printer Paper Out | Trouble-Printer Paper Out |
| 336 | Local Printer Failure | Trouble-Local Printer |
| 337 | EXP. MOD. DC LOSS | Trouble-Exp. Mod. DC Loss-# |
| 338 | EXP. MOD. LOW BAT | Trouble Exp. Mod. Low Batt-# |
| 339 | EXP. MOD. RESET | Trouble-Exp. Mod. Reset-# |
| 341 | EXP. MOD. TAMPER | Trouble-Exp. Mod. Tamper-# (5881ENHC) |
| 342 | Exp. Module AC Loss | Trouble-Exp. Module AC Loss-# |
| 343 | Exp. Module Self Test Fail | Trouble-Exp. Self-Test Fail-# |
| 344 | RF Rcvr Jam Detect # | Trouble-RF Rcvr Jam Detect-# |
| 345 | AES Encryption disabled/enabled | Trouble-AES Encryption |

COMMUNICATION TROUBLES:

| | | |
|---|---|---|
| 350 | Communication | Trouble-Communication Failure |
| 351 | TELCO 1 FAULT | Trouble-Phone line # 1 Comes in as zone 1 on a V20P panel |

Exhibit A
ADEMCO CONTACT ID REPORTING
(revised Oct. 1, 2012)

| | | |
|---|---|---|
| 352 | TELCO 2 FAULT | Trouble-Phone Line # 2 |
| 353 | LR Radion Xmitter Fault (333) | Trouble-Radio Transmitter - Comm Path problem between panel and Irr (Old) |
| 354 | FAILURE TO COMMUNICATE | Trouble-Fail to Communicate |
| E355 | Loss of Radio Super. (R330) | Trouble-Radio Supervision - From LRR - ECP data connection to panel |
| 356 | Loss of Central Polling | Trouble-Central Radion Polling |
| 357 | LRR XMTR. VSWR | Trouble-Radio Xmitter. VSWR-# |

PROTECTION LOOP:

| | | |
|---|---|---|
| 370 | Protection Loop | Trouble-Protection Loop-# |

Note: Uplink cell backup devices send zone 99 for a low battery and a zone 97 for communication failure (no response from poll). These will report as contact ID E370 (protection loop). let me clarify this: these are signals GENERATED by the uplink to indicate STATUS of the uplink. Of course, central station will assume that they were generated by the panel. Additional codes that may be sent would be for zones 81-86 which correspond to hardwire inputs 1-6. The contact ID message for these is selected by uplink when it is programmed.

| | | |
|---|---|---|
| 371 | Protection Loop Open | Trouble-Prot. Loop Open-# |
| 372 | Protection Loop Short | Trouble-Prot. Loop Short-# |
| 373 | FIRE TROUBLE | Trouble-Fire Loop-# (Supervision Loss, base tamper, Supervisory open) |
| 374 | EXIT ERROR (BY USER) | Alarm-Exit Error-# |
| 375 | Panic Zone Trouble | Trouble-PA Trouble-# |
| 376 | Hold-Up Zone Trouble | Trouble-Hold-Up Trouble-# |
| 377 | Swinger Trouble | Trouble - Swinger Trouble-# |
| 378 | Cross-zone Trouble | Trouble - Cross Zone Trouble - # (restore not applicable) |

SENSOR:

| | | |
|---|---|---|
| 380 | SENSOR TRBL - GLOBAL | Trouble-Sensor Trouble-# (zone type 5 and 19) |
| 381 | LOSS OF SUPERVISION | Trouble-RF Sensor Super.-# |
| 382 | LOSS OF SUPRVSN | Trouble-RPM Sensor Super.-# |
| 383 | SENSOR TAMPER | Trouble-Sensor Tamper-#(Cover or Base) |
| 384 | RF LOW BATTERY | Trouble-RF Sensor Battery-# |
| 385 | SMOKE HI SENS. | Trouble-Smoke Hi Sens.-# |
| 386 | SMOKE LO SENS. | Trouble-Smoke Lo Sens.-# |
| -387 | INTRUSION HI SENS. | Trouble-Intrusion Hi Sens.-# |
| -388 | INTRUSION LO SENS. | Trouble-Intrusion Lo Sens.-#- These codes are similar to those used for smart | smoke detectors. The idea is to report a problem developing in the detector's operation.

| | | |
|---|---|---|
| 389 | DET. SELF TEST FAIL | Trouble-Sensor Test Fail-# (see Direct Wire #84) |
| 391 | Sensor Watch Failure | Trouble-Sensor Watch Fail-# |
| 392 | Drift Comp. Error | Trouble-Drift Comp. Error-#- Reported by Firelite panels. The panel is not able to | adjust its thresholds to balance out drift in the normal operating point of a smoke detetctor.

| | | |
|---|---|---|
| 393 | Maintenance Alert | Trouble-Maintenance Alert-# |

OPEN/CLOSE:

| | | | |
|---|---|---|---|
| 400 | Open/Close | Opening/Closing | E = Open, R = Close |
| 401 | OPEN/CLOSE BY USER | Opening-User #/Closing-User # | |
| 402 | Group O/C | Closing-Group User # | |
| 403 | AUTOMATIC OPEN/CLOSE | Opening-Automatic/Closing-Automatic (power up Armed) | |
| 404 | Late to O/C | Opening-Late/Closing-Late | |
| 405 | Deferred O/C | Event & Restore Not Applicable | |
| 406 | CANCEL (BY USER) | Opening-Cancel | |
| 407 | REMOTE ARM/DISARM | Opening-Remote/Closing-Remote | |
| 408 | QUICK ARM | Event Not Applicable for opening/Closing-Quick Arm | |
| 409 | KEYSWITCH OPEN/CLOSE | Opening-Keyswitch/Closing-Keyswitch | |
| 435 | Second Person Access | ACCESS - User # | |
| 436 | Irregular Access | ACCESS - Irregular Access - User # | |
| 441 | Armed Stay | Opening-Armed Stay/Closing-Armed Stay | |
| 442 | Keyswitch Armed Stay | Opening-Keysw. Arm Stay/Opening-Keysw. Arm Stay | |
| 450 | Exception O/C | Opening-Exception/Closing-Exception | |
| 451 | Early O/C | Opening-Early/Closing-Early-User # | |
| 452 | Late O/C | Opening-Late/Closing-Late-User # | |
| 453 | Failed to Open | Trouble-Fail to open (Restore not applicable) | |
| 454 | Failed to Close | Trouble-Fail to Close (Restore not applicable) | |
| 455 | Auto-Arm Failed | Trouble-Auto Arm Failed (Restore not applicable) | |
| 456 | Partial Arm | Closing-Partial arm-User # | |
| 457 | Exit Error (User) | Closing-Exit Error-User # | |
| 458 | User on Premises | Opening-User on Prem. - User # | |
| 459 | Recent Close | Trouble-Recent Close - User # (Restore not applicable) | |
| 461 | Wrong Code Entry | Access -Wrong Code entry (Restore not applicable) | |
| 462 | Legal Code Entry | Acces-Legal Code entry - user # (Restore not applicable) | |
| 463 | Re-arm after Alarm | Status-Re Arm After Alarm-User # (restore not applicable) | |
| 464 | Auto Arm Time Extended | Status-Auto Arm Time Ext. - User # (Restore not applicable) | |
| 465 | Panic Alarm Reset | Status-PA Reset (Restore not applicable) | |
| 466 | Service On/Off Premises | Access - Service on Prem - User # | |
| | | Access - Service off Prem - User # | |

REMOTE ACCESS:

| | | |
|---|---|---|
| 411 | CALLBACK REQUESTED | Remote-Callback Requested (No Restore) Enabled with O/C reports |
| 412 | Success-Download/access | Remote-Successful Access (Restore Not Appllicable) |

-continued

Exhibit A
ADEMCO CONTACT ID REPORTING
(revised Oct. 1, 2012)

| | | |
|---|---|---|
| 413 | Unsuccessful Access | Remote-Unsuccessful Access (Restore Not Applicable) |
| 414 | System Shutdown | Remote-System Shutdown |
| 415 | Dialer Shutdown | Remote-Dialer Shutdown |
| 416 | Successful Upload | Remote-Successful Upload (Restore Not Applicable) |
| ACCESS CONTROL: | | |
| 421 | Access Denied | Access-Access Denied-User # (Restore Not Applicable) |
| 422 | Access Report by User | Access-Access Gained - User# (Restore Not Applicable) |
| 423 | Forced Access | Panic-Forced Access-# |
| 424 | Egress Denied | Access-Egress Denied (Restore Not Applicable) |
| 425 | Egress Granted | Access-Egress Granted-# (Restore Not Applicable) |
| 426 | Access Door Propped Open | Access-Door Propped Open-# |
| 427 | Access Point DSM Trouble | Access-ACS Point DSM Trbl.-# |
| 428 | Access Point RTE Trouble | Access-ACS Point RTE Trbl.-# |
| 429 | Access Program Mode Entry | Access-ACS Prog. Entry-User # (Restore Not Applicable) |
| 430 | Access Program Mode Exit | Access-ACS Prog. Exit-User # (Restore Not Applicable) |
| 431 | Access Threat Level Change | Access-ACS Threat Level Chg. |
| 432 | Access Relay/Trigger Fail | Access-ACS Relay/Trig. Fail-# |
| 433 | Access RTE Shunt | Access-ACS RTE Shunt-# |
| 434 | Access DSM Shunt | Access-ACS DSM Shunt-# |
| SYSTEM DISABLES: | | |
| 501 | Access Reader Disable | Disable-Acces Rdr. Disable-# |
| SOUNDER/RELAY DISABLES: | | |
| 520 | Sounder/Relay Disable | Disable-Sounder/Relay-# |
| 521 | Bell 1 Disable | Disable-Bell/Siren # 1 |
| 522 | Bell 2 Disable | Disable-Bell/Siren # 2 |
| 523 | Alarm Relay Disable | Disable-Alarm Relay |
| 524 | Trouble Relay Disable | Disable-Trouble Relay |
| 525 | Reversing Relay Disable | Disable-Reversing Relay |
| 526 | Notification Appliance Ckt #3 | Disable-Notification Appl. Ckt#3 |
| 527 | Notification Appliance Ckt #4 | Disable-Notification Appl. Ckt#4 |
| SYSTEM PERIPHERAL DISABLES: | | |
| 531 | Module Added | Super.-Module Added (Restore Not Applicable) |
| 532 | Module Removed | Super.-Module Removed (Restore Not Applicable) |
| COMMUNICATION DISABLES: | | |
| 551 | Dialer Disabled | Disable-Dialer Disable |
| 552 | Radio Xmitter Disabled | Disable-Radio Disable |
| 553 | Remote Upload/Download | Disable-Rem. Up/download Disable |
| BYPASSES: | | |
| 570 | ZONE/SENSOR BYPASS | Bypass-Zone Bypass-# |
| 571 | Fire Bypass | Bypass Fire Bypass-# |
| 572 | 24 Hour Zone Bypass | Bypass 24 Hour Bypass-# |
| 573 | Burg. Bypass | Bypass-Burg. Bypass-# |
| 574 | Group Bypass | Bypass-Group Bypass-User # |
| 575 | SWINGER BYPASS | Bypass-Swinger Bypass-# |
| 576 | Access Zone Shunt | Access-ACS Zone Shunt-# |
| 577 | Access Point Bypass | Access-ACS Point Bypass-# |
| 578 | Zone Bypass | Bypass - Vault Bypass - # |
| 579 | Zone Bypass | Bypass - Vent Zone Bypass - # |
| TEST/MISC: | | |
| 601 | MANUAL TEST | Test-Manually Triggered (Restore Not Applicable) |
| 602 | PERIODIC TEST | Test-Periodic (Restore Not Applicable |
| 603 | Periodic RF Xmission | Test-Periodic Radio (Restore Not Applicable) |
| 604 | FIRE TEST | Test-Fire Walk Test-User # |
| 605 | Status Report To Follow | Test-Fire Walk Test-User # |
| 606 | LISTEN-IN TO FOLLOW | Listen-Listen-In Active (Restore Not Applicble) |
| 607 | WALK-TEST MODE | Test-Walk Test Mode-User # |
| 608 | System Trouble Present | Test-System Trouble Present (Restore Not Applicable) |
| 609 | VIDEO XMTR ACTIVE | Listen-Video Xmitter Active (Restore Not Applicable) |
| 611 | POINT TESTED OK | Test-Point Tested OK-# (Restore Not Applicable) |
| 612 | POINT NOT TESTED | Test-Point Not Tested-# (Restore Not Applicable) |
| 613 | Intrusion Zone Walk Tested | Test-TntrnZone Walk Test-# (Restore Not Applicable) |
| 614 | Fire Zone Walk Tested | Test-Fire Zone Walk Test-# (Restore Not Applicable) |
| 615 | Panic Zone Walk Tested | Test-PA Zone Walk Test (Restore Not Applicable) |
| 616 | Service Request | Trouble-Service Request |
| EVENT LOG: | | |
| 621 | EVENT LOG RESET | Trouble-Event Log Reset (Restore Not Applicable) |
| 622 | EVENT LOG 50% FULL | Trouble-Event Log 50% Full (Restore Not Applicable) |

-continued

Exhibit A
ADEMCO CONTACT ID REPORTING
(revised Oct. 1, 2012)

| | | |
|---|---|---|
| 623 | EVENT LOG 90% FULL | Trouble-Event Log 90% Full (Restore Not Applicable) |
| 624 | EVENT LOG OVERFLOW | Trouble-Event Log Overflow (Restore Not Applicable) |
| 625 | TIME/DATE RESET | Trouble-Time/Date Reset-User # (Restore Not Applicable) |
| 626 | TIME/DATE INACCURATE | Trouble-Time/Date Invalid (clock not stamping to log correctly) |
| 627 | PROGRAM MODE ENTRY | Trouble-Program Mode Entry (Restore Not Applicable) |
| 628 | PROGRAM MODE EXIT | Trouble-Program Mode Exit (Restore Not Applicable |

SCHEDULING:

| | | |
|---|---|---|
| 630 | Schedule Change | Trouble-Schedule Changed (Restore Not Applicable) |
| 631 | Exception Sched. Change | Trouble-Esc. Sched. Changed (Restore Not Applicable) |
| 632 | Access Schedule Change | Trouble-Access Sched. Changed (Restore Not Applicable) |

PERSONNEL MONITORING:

| | | |
|---|---|---|
| 641 | Senior Watch Trouble | Trouble-Senior Watch Trouble - This code, is also refered to as 'up and about'. It means that a person has not moved about their home for a preset period of time. |
| 642 | Latch-key Supervision | Status-Latch-key Super-User # (Restore Not Applicable) Used to report when a certain user has returned home and disarmed the alarm. |

SPECIAL CODES:

| | |
|---|---|
| 651 | Code sent to identify the control panel as an ADT Authorized Dealer. |
| 750-789 | These codes are use by Protection One and can be assigned any unique non-standard Event code, which Pro 1 will be tracking. Also can be used on custom zone types. |

Miscellaneous:

| | | |
|---|---|---|
| 654 | System Inactivity | Trouble - System Inactivity |
| 900 | Download Abort | Remote - Download Abort (Restore not applicable) |
| 901 | Download Start/End | Remote - Download Start - # |
| | | Remote - Download End - # |
| 902 | Download Interrupted | Remote - Download Interrupt - # |
| 910 | Auto-Close with Bypass | Closing - Auto Auto Close - Bypass - # |
| 911 | Bypass Closing | Closing - Bypass Closing - # |
| 912 | Fire Alarm Silenced | Event |
| 913 | Supervisory Point test Start/End | Event - User-# |
| 914 | Hold-up test Start/End | Event - User-# |
| 915 | Burg. Test Print Start/End | Event |
| 916 | Supervisory Test Print Start/End | Event |
| 917 | Burg. Diagnostics Start/End | Event |
| 918 | Fire Diagnostics Start/End | Event |
| 919 | Untyped diagnostics | Event |
| 920 | Trouble Closing (closed with burg. during exit) | |
| 921 | Access Denied Code Unknown | Event |
| 922 | Supervisory Point Alarm | Alarm - Zone # |
| 923 | Supervisory Point Bypass | Event - Zone # |
| 924 | Supervisory Point Trouble | Trouble - Zone # |
| 925 | Hold-up Point Bypass | Event - Zone # |
| 926 | AC Failure for 4 hours | Event |
| 927 | Output Trouble | Trouble |
| 928 | User code for event | Event |
| 929 | Log-off | Event |
| 954 | CS Connection Failure | Event |
| 961 | Rcvr Database Connection Fail/Restore | |
| 962 | License Expiration Notify | Event |

Other:

| | | |
|---|---|---|
| 999 | 1 and 1/3 DAY NO READ LOG | EVENT LOG ONLY, No report to CS. V20/lynx |

What is claimed is:

1. An event communication module, comprising:
a connection interface for receiving event information from a base station, the event information comprising an event code indicative of a condition occurring at a premises where the base station is located;
a memory for storing processor-executable instructions and criteria for determining a communication method used to transmit information;
a processor for executing the processor-executable instructions that cause the event communication module to:
decode the event code from the event information;
select a first transmission method from two or more transmission methods based on the event code and the criteria; and
encode the event code into a format suitable for transmission in conformance with the first transmission method selected by the processor; and
a first communication module, configured to transmit the encoded event code using the first transmission method.

2. The alarm event communication module of claim 1, wherein the processor-executable instructions further comprise instructions that causes the alarm event communication module to:
prior to encoding the event code into a format suitable for transmission, re-encode the decoded event code in a format compatible with the base station.

3. The event communication module of claim 1, wherein the processor-executable instructions for retrieving the event code from the event information further comprise instructions that cause the event communication module to decode the event information in accordance with an alarm reporting protocol.

4. The event communication module of claim 1, wherein the criteria comprises the two or more communication methods available to the event communication module in a preferential order.

5. The event communication module of claim 4, wherein the processor-executable instructions further comprise instructions that causes the event communication module to:
determine that the first transmission method has failed; and
transmit the encoded event code using the second communication module.

6. The event communication module of claim 1, wherein the criteria comprises a stored urgency level associated with one or more event codes and the processor-executable instructions for selecting a first transmission method comprises instructions that cause the event communication module to:
determine an urgency level associated with the received event code; and
determine a transmission method from the memory associated with the urgency level;
wherein transmitting the encoded event code using the first transmission method comprises transmitting the encoded event code using the transmission method associated with the urgency level.

7. The event communication module of claim 6, wherein the urgency level represents an emergency condition and the first transmission method comprises the most reliable transmission method available to the event communication module.

8. The event communication module of claim 6, wherein the urgency level represents a non-urgent condition and the first transmission method comprises the least costly transmission method available to the event communication module.

9. The event communication module of claim 6, wherein the processor-executable instructions further comprise instructions that causes the event communication module to:
determine that the first transmission method has failed;
determine a second transmission method associated with the urgency level; and
transmit the encoded event code using the second transmission method associated with the urgency level.

10. The event communication module of claim 1, wherein the memory further stores contact information of a person to be notified when an urgent event is received from the base station, and the processor-executable instructions further comprise instructions that causes the event communication module to:
transmit an alert to the person indicative of a condition associated with the event code using the contact information stored in the memory.

11. The event communication module of claim 1, wherein the processor is further configured to provide an acknowledgement to the base station via the connection interface indicative of whether the event code was successfully received by the event communication module.

12. The event communication module of claim 1, further comprising:
a speaker;
a microphone; and
audio circuitry coupled to the processor;
wherein the processor-executable instructions further comprise instructions that causes the event communication module to provide at least a one-way voice communication between the location of the base station and a remote location.

13. The event communication module of claim 12, wherein the audio circuitry is activated when a pre-determined event code is transmitted to the remote location.

14. The event communication module of claim 1, further comprising:
a second communication module, configured to transmit the encoded event code using a second transmission method.

15. The event communication module of claim 1, wherein the first communication module is configured to transmit the event code using either the first communication method or a second communication method.

16. The event communication module of claim 1, wherein the processor-executable instructions further comprise instructions that causes the event communication module to:
receive a subsequent event code, via the connection interface, indicative of a desire to establish an audio communication;
establish an audio communication with a remote location using the first communication module;
establish an audio communication with the base station; and
encode audio information received via the connection interface for transmission to the remote location using the first communication module.

17. The event communication module of claim 16, wherein the first event code is transmitted using the first communication method and the subsequent event code is transmitted using a second communication method.

18. A method for relaying event codes from a base station to a remote location by an event communication module, executed by an event communication module, comprising:
receiving an encoded event code from a base station over an interface connection;
selecting a first transmission method from two or more communication methods based on the received event code by a processor;
encoding the event code based on the first communication method by the processor; and
transmitting the encoded event code to remote location by a communication module configured to communicate using the first communication method.

19. The method of claim 18, further comprising:
determining, by the processor, an urgency level associated with the received event code; and
determining, by the processor, a preferred communication method stored in a memory based on the urgency level;
wherein selecting a first transmission method comprises the processor selecting the preferred transmission method associated with the urgency level.

20. The method of claim 18, wherein determining an urgency level associated with the received event code comprises:
determining whether the received event code is present in a list of event codes stored in the memory; and
retrieving a stored urgency level associated with the stored event code.

* * * * *